(12) United States Patent
Ai et al.

(10) Patent No.: US 8,727,646 B2
(45) Date of Patent: May 20, 2014

(54) FOCAL PLANE SHUTTER FOR DIGITAL CAMERAS

(75) Inventors: Tsubasa Ai, Tokyo (JP); Kenta Kawakami, Saitama (JP); Nobuyoshi Inoue, Saitama (JP)

(73) Assignee: Nidec Copal Corporation, Tokyo (JP)

( * ) Notice: Subject to any disclaimer, the term of this patent is extended or adjusted under 35 U.S.C. 154(b) by 394 days.

(21) Appl. No.: 13/045,192

(22) Filed: Mar. 10, 2011

(65) Prior Publication Data

US 2011/0222843 A1 Sep. 15, 2011

(30) Foreign Application Priority Data

Mar. 11, 2010 (JP) .................. 2010-055132

(51) Int. Cl.
*G03B 9/08* (2006.01)
*G03B 9/40* (2006.01)

(52) U.S. Cl.
USPC .......................... 396/469; 396/484

(58) Field of Classification Search
USPC ................. 396/469, 452, 483, 484
See application file for complete search history.

(56) References Cited

U.S. PATENT DOCUMENTS

2001/0010560 A1* 8/2001 Takahashi .............. 348/367

FOREIGN PATENT DOCUMENTS

| JP | 2001-215555 | 8/2001 |
| JP | 2001-305605 | 11/2001 |

* cited by examiner

*Primary Examiner* — Rochelle-Ann J Blackman
(74) *Attorney, Agent, or Firm* — Wenderoth, Lind & Ponack, L.L.P.

(57) ABSTRACT

When a hold member rotates on a shaft counterclockwise in the set operation, pressing parts of a pressing member which is fitted on top end of the hold member press pressed parts of iron piece members to rotate a lock-releasing member for a first blade and a lock-releasing member for a rear blade so that the iron piece members are made to come into contact with iron-core members of electromagnets, while an engagement pin presses an arm of a connection spring to rotate a restraining member clockwise so that a restraining part of the restraining member moves into the trajectory of the movement of a restrained part of the lock-releasing member for the rear blade. When the coils of the electromagnets are not electrified and the hold member rotates clockwise, the lock-releasing member for the front blade presses a front blade locking member to make it possible to perform an open operation of the front blade, while the lock-releasing member for the rear blade cannot press a rear blade locking member because the lock-releasing member for the rear blade is restrained by the restraining member. As a result, an exposure aperture is fully opened, and it becomes possible to perform observation with electronic finder.

5 Claims, 13 Drawing Sheets

FIG.4A
FIG.4B
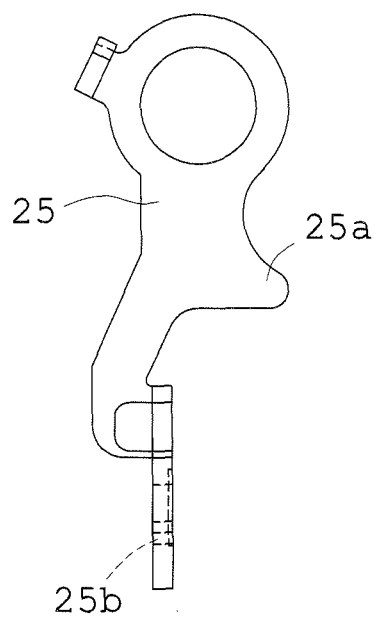
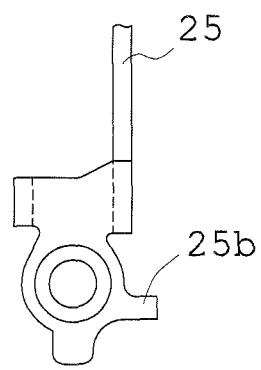

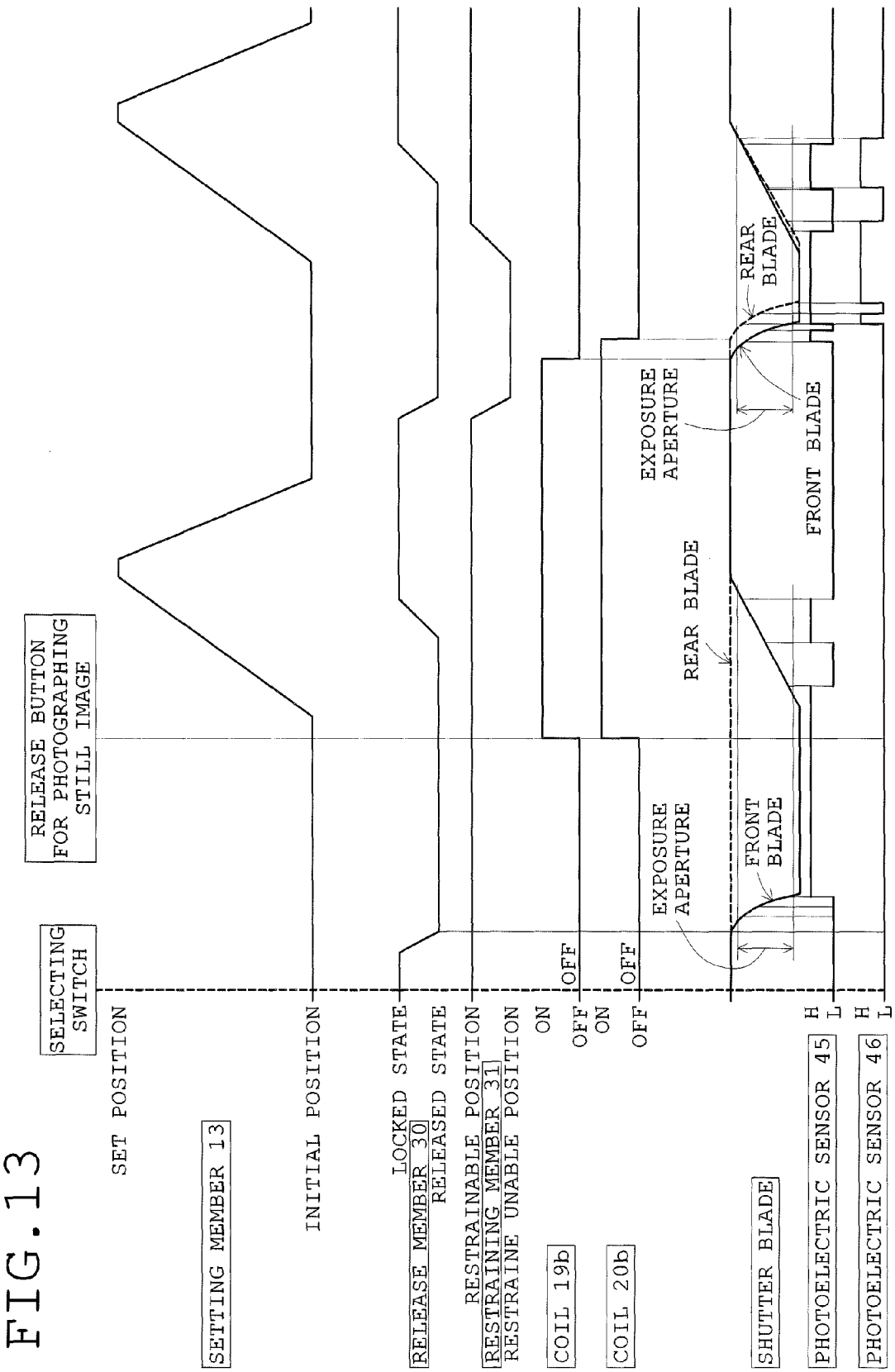

FOCAL PLANE SHUTTER FOR DIGITAL CAMERAS

BACKGROUND OF THE INVENTION

1. Field of the Invention

This invention relates to a focal plane shutter for digital cameras.

2. Description of Related Art

Focal plane shutters for digital cameras includes a plane focal shutter which is provided with two shutter blades, a front blade and a rear blade. And, this type of focal plane shutter is usually formed in such a way that: the front and rear blades are connected to driving members for the front and rear blades respectively; in the set state in which shooting is not performed, the front blade covers an exposure aperture and the rear blade draws apart from the exposure aperture; and in shooting, these two driving members are rotated in turn and in the same direction by biasing forces of driving springs for the front and rear blades respectively so that the front blade opens the exposure aperture and the rear blade is closed after the opening of the exposure aperture in order to expose the imaging plane of an image pick-up apparatus, like focal plane shutters for film-based cameras. Accordingly, digital cameras which are provided with focal plane shutters having such a constitution are provided with optical finders.

Also, in focal plane shutters for digital cameras having such a constitution, when the rear blade completely closes the exposure aperture, imaging information is sent from the image pick-up apparatus through an information processing circuit and is written to a memory device, and then a set operation is immediately performed. The set operation is performed in such a way that a set member which is rotated from its initial position makes the two driving members reverse up to the set state against the biasing forces of the driving springs for the two driving members respectively. And, it is known that constitutions for keeping the two driving members in their set states until next shooting is performed include constitutions which are called a locking-type constitution and a direct-type constitution respectively.

That is to say, the locking-type constitution is such that the two driving members are locked into locking members until the front and rear blades are made to perform the exposure operation in shooting. Accordingly, the set member can be formed in such a way that the set member returns to its initial position immediately after the two driving members are locked into the locking members at their set states respectively because of the set operation. However, the set member can also be formed in such a way that the set member is returned to its initial position prior to the operation of the front blade opening in releasing the camera shutter. And, two release members which can be actuated in turn by electromagnets respectively release the driving members which are locked into the locking members respectively, so that the exposure operations of the front and rear blades are performed.

On the other hand, the direct-type constitution is such that: each of the two driving members is provided with an iron piece member; and the set member rotates the two driving members against the biasing forces of the driving springs for the two driving members until the iron-piece members come into contact with electromagnets which are not excited yet, because of the set operation. Accordingly, the set member is formed in such a way that: the set member is not made to return to its initial position immediately; the set member is kept in a state of the set member making the iron-pieces members come into contact the electromagnets also after that; and the set member is returned to its initial position after each of the electromagnets is excited and the electromagnets attract and hold the iron-piece members through their magnetic attraction forces in a release of the camera. And then, the electromagnets are demagnetized in turn in order to release the magnetic attraction forces which act on the iron-piece members, so that the exposure operations of the front and rear blades are performed.

The present invention relates to a focal plane shutter for digital cameras having the locking-type constitution of the above-described constitutions. A focal plane shutter for cameras which has such a locking-type constitution and is available for both digital and film-based cameras is disclosed in Japanese Patent Kokai No. 2001-305605.

Now, also in a digital camera which is provided with such a focal plane shutter having the locking-type constitution, there is a demand that shooting can be performed with an electronic view monitor (which is called "monitor" hereinafter) having a display device like liquid crystal or EL (Electroluminescence) even in the case where the digital camera is provided with an optical view finder (which is called "optical finder" hereinafter), in recent years. And, in this case, it is preferred that an image sensor for shooting is also used for monitor. In recent years, while shooting which is performed with an optical finder is called normal shooting (optical view shooting), shooting which is performed with such a monitor has come to be called live-view shooting or the like, independently of whether a focal plane shutter has the locking-type construction or the direct-type constitution.

Also, a plurality of shooting modes for a focal plane shutter including two shutter blades are known in the case where shooting is performed with a monitor the image sensor of which is also used as an image sensor for shooting. Typical one of the shooting modes is performed in such a way that: both front and rear blades are made to drawn apart from an exposure aperture in the set state; and when a release button is pressed in shooting, the front blade is actuated so as to cover the exposure aperture in the first stage of the typical shooting mode, and both the front and rear blades are made to perform the exposure operation in turn in the next stage of the typical shooting stage. And, a locking-type focal plane shutter for digital cameras which makes it possible to perform such an operation is disclosed in Japanese Patent Kokai No. 2001-215555.

Also, among shooting modes except the above-described typical shooting mode into which the above typical shooting mode or a shooting mode with an optical finder can be changed by a photographer operating a selection means which is provided for a camera to perform shooting, there is a shooting mode in which: both front and rear blades are made to drawn apart from an exposure aperture; and when a release button is pressed in shooting, the front blade is not actuated and an image sensor is controlled by an electronic control circuit so as to start shooting, and the rear blade closes the exposure aperture so as to finish the shooting. In addition, there is also a shooting mode in which the electronic control circuit controls the operations in both of the start and termination of shooting without driving both the front and rear blades. Furthermore, a digital camera may be also formed in such a way that it is possible to shoot a moving image by operating the above selection means or pressing a second release button with both the front and rear blades made to draw apart from the exposure aperture so that the electronic control circuit repeatedly performs a set operation all the time the release button is pressed.

SUMMARY OF THE INVENTION

As described above, if a digital camera is provided with a locking-type focal plane shutter which is disclosed in Japanese Patent Kokai No. 2001-305605, while it is possible to perform shooting with an optical finder in the digital camera, it is impossible to perform shooting with a monitor the image sensor of which is also used for shooting in the digital camera. Also, if a digital camera is provided with a locking-type focal plane shutter which is disclosed in Japanese Patent Kokai No. 2001-215555, while it is possible to perform shooting with a monitor the image sensor of which is also used for shooting in the digital camera, the digital camera must be provided with a half mirror in order that it is also possible to perform shooting with an optical finder in the digital camera. Accordingly, there is a problem that these focal plane shutters in the prior art are unfavorable for camera performance and cost.

The present invention is made in order to solve such a problem. The object of the present invention is to offer a locking-type focal plane shutter for digital cameras which includes two shutter blades and makes it possible to perform shooting in a shooting mode with a optical finder and shooting in a shooting mode with monitor the image sensor of which is also used for shooting by a photographer performing operation of a camera before shooting.

In order to achieve the above object, a focal plane shutter for digital cameras of the present invention in which a front and rear blades are arranged in two blade rooms that are formed by a middle plate separating a shutter base plate and an auxiliary base plate respectively, is formed in such a way that the focal plane shutter comprises: a front blade-locking member into which a front blade driving member is locked until the front blade driving member is rotated by the biasing force of a front blade driving spring so as to start the exposure operation of the front blade; a rear blade locking member into which a rear blade driving member is locked until the rear blade driving member is rotated by the biasing force of a rear blade driving spring so as to start the exposure operation of the rear blade; a lock-releasing means for the front blade which is made to come into contact with an iron-core member of an electromagnet for the front blade in the set state, is attracted and held by the iron-core member of the electromagnet for the front blade when a coil of the electromagnet for the front blade is electrified, and then is separated from the iron-core member of the electromagnet for the front blade by the biasing force of a front blade releasing spring to release the front blade driving member from the front blade locking member, when the supply of electric current to the coil of the electromagnet for the front blade is cut off; a lock-releasing means for the rear blade which is made to come into contact with an iron-core member of an electromagnet for the rear blade in the set state, is attracted and held by the iron-core member of the electromagnet for the rear blade when a coil of the electromagnet for the rear blade is electrified, and then is separated from the iron-core member of the electromagnet for the rear blade by the biasing force of a rear blade releasing spring to release the rear blade driving member from the rear blade locking member, when the supply of electric current to the coil of the electromagnet for the rear blade is cut off; a hold means which presses the two lock-releasing members against the biasing forces of the two blade-releasing springs to make the two lock-releasing members come into contact with the two iron-core members in the set state and releases the two lock-releasing members from the pressing force to be moved to the outsides of the trajectories of the two lock-releasing members moving when the coils of the two electromagnets are electrified in shooting; and a restraining member which is made to rotate in a reciprocating manner in response to the reciprocation of the hold means, is moved into the trajectory of the lock-releasing means for the rear blade moving in the set state, and can then restrain the lock-releasing means for the rear blade that moves away from the iron-core member of the electromagnet for the rear blade, before the lock-releasing means for the rear blade releases the rear blade driving member from the rear blade locking member, when the hold means is moved to the outsides of the trajectories of the two lock-releasing members moving and the coils of the electromagnet for the rear blade is not electrified.

In this case, it is very preferable that the focal plane shutter is formed in such a way that: the hold means is provided with an engagement part; the restraining member is also provided with an engagement part; a spring is wound around a rotation shaft of the restraining member; the engagement part of the restraining member exists between the both arm portions of the spring; the spring has biasing force with which the engagement part of the hold means that is put between the both arm portions of the spring is held by the ends of the both arm portions of the spring; the engagement part of the hold means presses one arm portion of the spring in moving the hold means to the set position, so that the other arm portion of the spring is made to press the engagement part of the restraining member and the restraining member is moved into the trajectory of the lock-releasing means for the rear blade moving; and the engagement part of the hold means presses the other arm portion of the spring in moving the hold means from the set position, so that the one arm portion of the spring is made to press the engagement part of the restraining member and the restraining member is moved to the outside of the trajectory of the lock-releasing means for the rear blade moving.

Also, a focal plane shutter of the present invention is formed in such a way that: the rear blade driving member is composed of a first rear blade-driving member and a second rear blade-driving member which are rotatably fitted to the same shaft; the first rear blade-driving member is connected to the rear blade and is made to follow the second rear blade-driving member by the biasing force of a setting spring to rotate, in the set operation; and the second rear blade-driving member is locked into the rear blade locking member before the exposure operation of the rear blade is started, and the second rear blade-driving member is made to rotate by the biasing force of the rear blade driving spring to press the first rear blade-driving member against the biasing force of the setting spring when the second rear blade-driving member is released from the rear blade locking member. As a result, the size of the whole of the shutter in the direction of the front and rear blades moving can be made to become small.

Also, a focal plane shutter of the present invention is formed in such a way that: the rear blade includes two arms which are pivotally fitted to the shutter base plate, and a plurality of approximately oblong card-shaped blades which are pivotally supported by these arms along the direction of the lengths of the arms in turn; the oblong card-shaped blades draw apart from the exposure aperture and overlap with one another in the set state; and the contour edge of the area of the middle plate which overlaps with a plurality of the oblong card-shaped blades in the set state is shaped like an arc which becomes convex toward the exposure-aperture side, and the width with which the middle plate overlaps with a plurality of the oblong card-shaped blades becomes small in the approximately middle portion in the directions of the lengths of the oblong card-shaped blades. As a result, the contact area between the rear blade and the middle plate becomes small, so that it is possible to smoothly start the exposure operation of the rear blade.

Also, a focal plane shutter of the present invention is formed in such a way that: the hold means can rotate within a set range of rotation angles and includes a pressing member the two pressing parts of which press the two lock-releasing members against the biasing forces of the two blade-releasing springs in the set operation to make the two lock-releasing members come into contact with the two iron-core members; the hold means is locked into a release member in the set state; the hold means is actuated by the biasing force of a spring when the hold means is released from the release member into which the hold means is locked, so that the two lock-releasing members can be actuated by the biasing forces of the two blade-releasing springs; and at least one pressing part of the pressing member can meet a buffer member which is fitted to a member that is integrated with the shutter base plate, when the actuation of the hold means by the biasing force of the spring is stopped. As a result, the hold means becomes immovable early, so that it becomes possible to shorten the length of time between the press of a release button of a camera and a start of the exposure operation of the front blade.

A focal plane shutter of the digital cameras of the present invention, which is of locking type and includes two shutter blades, is formed in such a way that the restraining member is made to rotate in the reciprocating manner in response to the reciprocation of the hold means and is moved into the trajectory of the lock-releasing means for the rear blade moving, in the set termination state. As a result, a focal plane shutter of the present invention is characterized in that a photographer can perform shooting after selecting one of a shooting mode with optical finder and a shooting mode with monitor the image sensor of which is also used for shooting before the shooting.

These and other features and advantages of the present invention will become apparent from the following detailed description of the preferred embodiments when taken in conjunction with accompanying drawings.

BRIEF DESCRIPTION OF THE DRAWINGS

FIGS. 4A and 4B are views showing the lock-releasing member for the rear blade which is shown in FIG. 3, FIG. 4A is a plane view showing the lock-releasing member in the same manner as that in FIG. 3, and FIG. 4B is a side view showing a primary part of the lock-releasing member when the lock-releasing member shown in FIG. 4A is viewed from the right side of FIG. 4A.

FIG. 13 is a timing chart showing the relation between the operations of the main components of the focal plane shutter in the case where a still image is captured with a shooting mode with monitor.

DETAILED DESCRIPTION OF THE PREFERRED EMBODIMENTS

Figure 1:
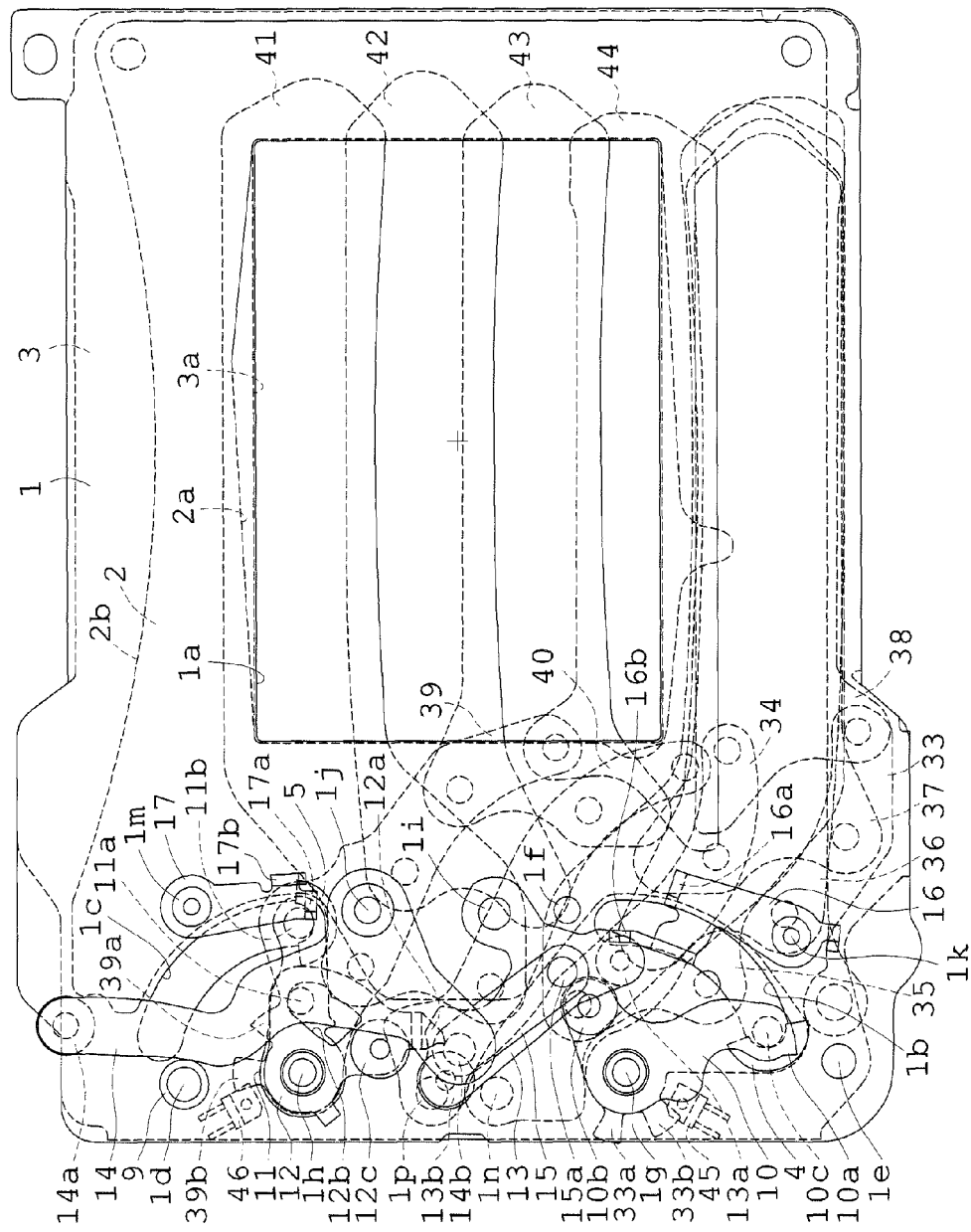
FIG. 1 is a plan view showing the state of a focal plane shutter for digital cameras of the present invention immediately after the termination of the exposure operation of the focal plane shutter, and mainly showing only components for an open and close operating mechanism which are arranged near the shutter base plate, with regard to a mechanism for controlling shutter blades.

The present invention will be explained using an embodiment which is shown in the drawings. Besides, a locking-type focal plane shutter for digital cameras of the present invention can be operated with various operation modes in shooting which is performed in such a way that exposure for shooting is made to start by the front blade beginning to open the exposure aperture and is finished by the rear blade completely closing the exposure aperture. The explanation of the operation of the focal plane shutter of the embodiment relates to the case where shooting is usually performed in a shooting mode with optical finder, shooting can be performed in a shooting mode with monitor only when a selection means provided for a camera is operated before shooting, and shooting for capturing a still image and shooting for capturing a moving image can be selectively performed when shooting is performed in the shooting mode with monitor.

Embodiment

First, the constitution of the focal plane shutter of the present embodiment will be explained mainly using FIGS. 1 to 4. Besides, FIG. 1 is a plan view showing the state of a focal plane shutter immediately after the termination of the exposure operation of the focal plane shutter. The constitutions of the shutter blades or the like which are arranged on the back side of the shutter base plate also are shown in broken lines. However, in the mechanism for controlling the shutter blades which is arranged on the top side (this side) of the shutter base plate and mainly consists of the open and close operating mechanism and the lock-releasing mechanism, only components for a open and close operating mechanism which are arranged near the shutter base plate are shown in FIG. 1. Also, FIG. 2 is a plan view showing only about the left half of the focal plane shutter shown in FIG. 1, with the left half portion of the focal plane shutter enlarged.

Figure 2:
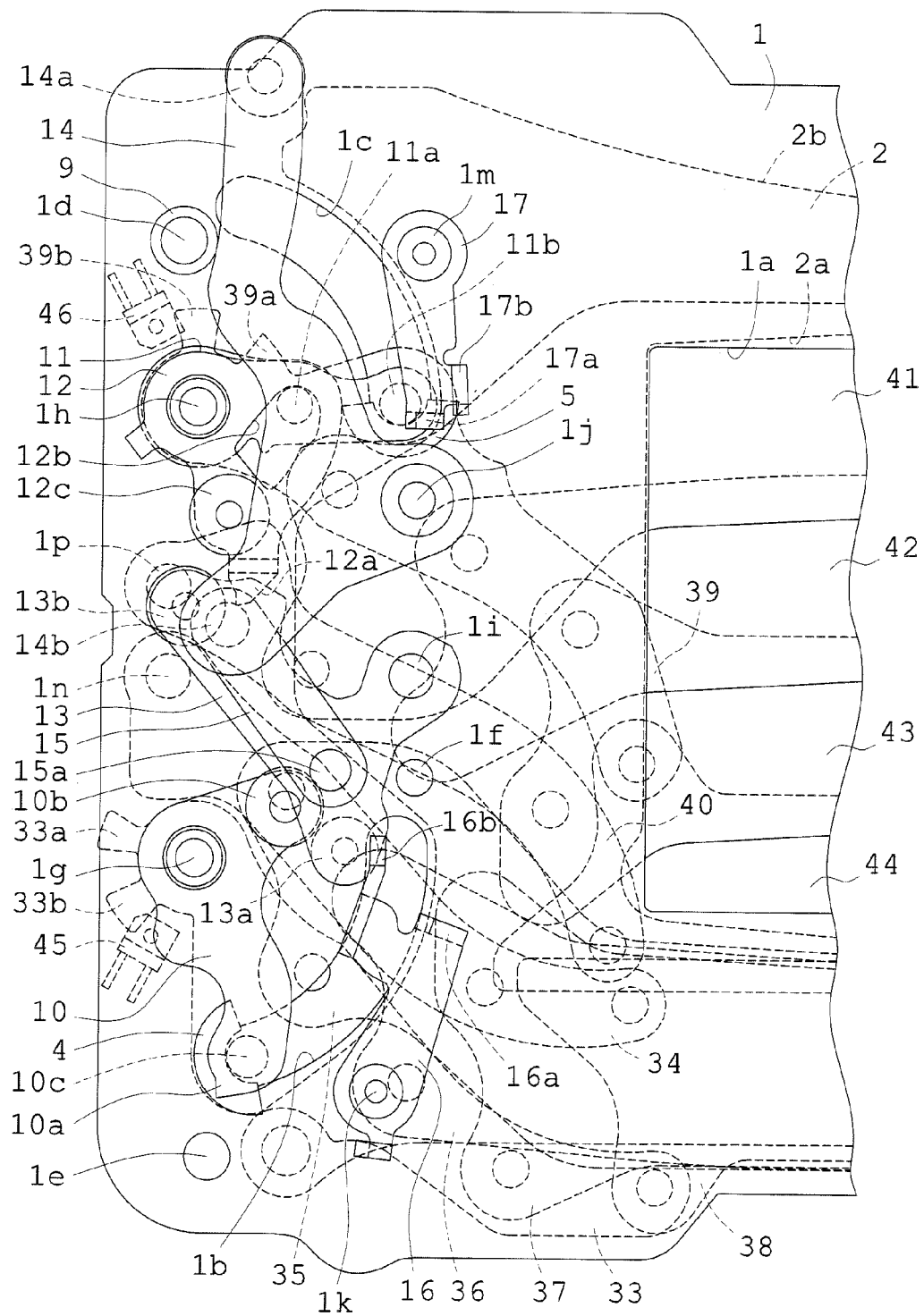
FIG. 2 is a plan view showing only about the left half of the focal plane shutter shown in FIG. 1.
Figure 3:
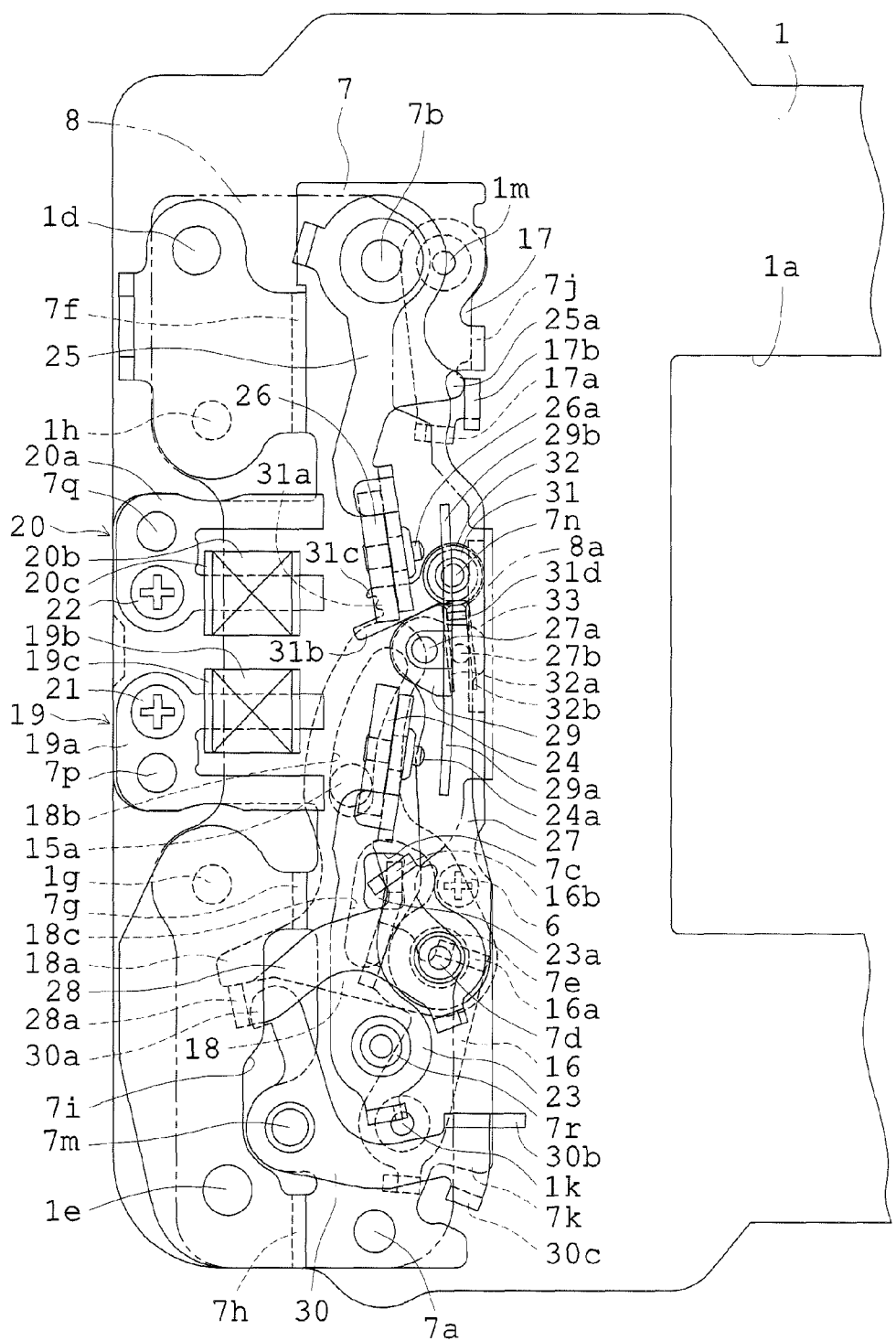
FIG. 3 is a plan view showing the same state of the focal plane shutter as that in FIGS. 1 and 2 in the same manner as that in the FIG. 2, and showing components for a lock-releasing mechanism which is arranged farther from the shutter base plate than the open and close operating mechanism shown mainly in FIG. 2 and is located over the open and close operating mechanism.

Also, FIG. 3 is a plan view showing components for a lock-releasing mechanism which is arranged farther from the shutter base plate than the open and close operating mechanism shown in FIG. 2 in such a way that the lock-releasing mechanism is located over the open and close operating mechanism, with the lock-releasing mechanism for the rear blade in the state immediately after the termination of the exposure operation, like the open and close operating mechanism shown in FIG. 2. Accordingly, FIG. 3 shows also a part of the constitution which is shown in FIG. 2. FIGS. 4A and 4B are views showing only a lock-releasing member for the rear blade shown in FIG. 3, FIG. 4A is a plane view showing the lock-releasing member for the rear blade in the same position of the lock-releasing member for the rear blade as that in FIG. 3, and FIG. 4B is a side view showing a primary part of the lock-releasing member for the rear blade when the lock-releasing member shown in FIG. 4A is viewed from the right side of FIG. 4A.

In FIG. 1, an aperture 1a is formed in the approximately middle portion of a shutter base plate 1. A middle plate 2 and an auxiliary base plate 3 are arranged on the back side of the shutter base plate 1 at given intervals and in turn. A space between the shutter base plate 1 and the middle plate 2 forms a blade room for a front blade which is described below, and a space between the middle plate 2 and the auxiliary base plate 3 forms a blade room for a rear blade which is described below. In addition, the middle plate 2 is also provided with an aperture 2a having a particular shape in the area that overlaps with the aperture 1a, and the auxiliary base plate 3 is also provided with a rectangular aperture 3a which is located in the area that overlaps with the aperture 1a and is somewhat larger than the aperture 1a. An exposure aperture which is formed in the shape of an oblong rectangle (or, an aperture for a shutter through which light from an object passes) is usually formed by only one of the apertures 1a, 2a, and 3a, or by combining two or more of the apertures 1a, 2a, and 3a. In the present embodiment, the exposure aperture is formed by only the aperture 1a.

Also, the middle plate 2 of the present embodiment is fitted to the shutter base plate 1 through fitting holes which are formed in three areas of the middle plate 2, or the upper right-hand, left lower-hand, and lower right-hand corners. And, the shape of a contour-forming edge which corresponds to the left-side portion of the aperture 2a is made to have a complex shape so as to avoid the trajectories of two driving pins moving which are explained below, as known in public. Also, in the middle plate 2, a contour-forming edge 2b which corresponds to the upper-side portion of the aperture 2a is formed in the shape of an arc which becomes convex toward the aperture-2a side, or toward the exposure-aperture which corresponds to the aperture 1a in the present embodiment. The reason why the upper-side portion of the aperture 2a has such a shape will be explained in the explanation of the operation below. Also, the auxiliary base plate 3 has approximately the same shape of the contour as the shutter base plate 1. However, the auxiliary base plate 3 is formed in such a way that the contour of the auxiliary base plate 3 is locally somewhat smaller than that of the shutter base plate 1. The auxiliary base plate 3 is fitted to the shutter base plate 1 not only through the same three areas of the auxiliary base plate 3 as that of the middle plate 2 but also through an upper left-hand part of the auxiliary base plate 3 which is not shown in the drawing. Besides, the contour of the auxiliary base plate 3 which is shown in FIG. 1 is not shown in FIG. 2.

As shown in FIGS. 1 and 2, arc-shaped elongate holes 1b and 1c are formed in the area of the shutter base plate 1 on the left side of the aperture 1a. The buffer members 4 and 5 which are made of rubber and the plane shapes of which is approximately shaped like the letter, "C" are fitted to the lower ends of the elongate holes 1b and 1c respectively, as known in public. Also, three pillars 1d, 1e, and 1f are erectly provided on the area of the shutter base plate 1 on the left side of the aperture 1a. The pillar 1f of these pillars is fixed on an upper base plate 7 by screwing a screw 6 into a screw hole which is formed in the top end of the pillar 1f, where the screw 6 is shown in FIG. 3. In addition, the pillars 1d and 1e are fitted to the upper base plate 7 halfway in the directions of the lengths of the pillars. In addition, the pillars 1d and 1e, together with pillars 7a and 7b which is erectly provided on the upper base plate 7, are fixed on a cover 8 (the contour of which is shown in long dashed double-short dashed lines) by screwing screws into screw holes which are formed in the top ends of the pillars respectively, as shown in FIG. 3, where these screws are not shown in the drawing.

Next, components which are arranged between the shutter base plate 1 and the upper base plate 7 will be explained mainly using FIG. 2. However, before explaining these components, shafts which are erectly provided on the shutter base plate 1 in order to fit these components to the shutter base plate 1 are explained. Six shafts 1g, 1h, 1i, 1j, 1k, and 1m are erectly provided on the shutter base plate 1 in such a way that the six shafts are erect toward the upper base plate 7. The shafts 1g and 1h penetrate the shutter base plate 1 so that the shaft parts of these shafts 1g and 1h are erectly provided also on the back side of the shutter base plate 1, and two arms of the front blade and two arms of the rear blade, which are explained below, are rotatably fitted to the shafts 1g and 1h, together with shafts 1n and 1p which are erectly provided on the back side of the shutter base plate 1, respectively. Also, small-diameter portions which are formed in the top ends of the shafts 1k and 1m respectively are fitted into holes which are formed in the upper base plate 7, respectively, so that the shafts 1k and 1m also play a role in supporting the upper base plate 7 with the ring-shaped level-difference surfaces of the top ends of shafts 1k and 1m.

Accordingly, a ring-shaped buffer member 9 is first fitted to the pillar 1d of the shutter base plate 1. Also, a front blade driving member 10 is rotatably fitted to the shaft part of the shaft 1g which is erectly located on the upper-base-plate-7 side, and the front blade driving member 10 is biased by a front blade driving spring which is not shown in the drawing, so that the front blade driving member 10 is clockwise rotated. Also, the front blade driving member 10 includes a locked part 10a, a roller 10b is rotatably fitted to the surface of the front blade driving member 10 on the upper-base-plate-7 side, and the front blade driving member 10 is provided with an driving pin 10c on the shutter-base-plate-1 side of the front blade driving member 10. And, the driving pin 10c penetrates an elongate hole 1b of the shutter base plate 1, so that the root portion of the driving pin 10c can meet the buffer member 4 and the top end portion of the driving pin 10c is connected to the front blade in the blade room. The constitution of the front blade will be explained below.

A first rear blade-driving member 11 and a second rear blade-driving member 12 are rotatably fitted to the shaft part of the shaft 1h of the shutter base plate 1 which is erectly located on the upper-base-plate-7 side, in such a way that the first and second rear blade-driving members 11 and 12 can be rotated independently of each other and the first rear blade-driving member 11 is arranged on the shutter-base-plate-1 side. And, the first rear blade-driving member 11 is provided with a cylinder-shaped engagement part 11a on the upper-base-plate-7 side and with a driving pin 11b on the shutter-base-plate-1 side. And, the driving pin 11b penetrates the elongate hole 1c of the shutter base plate 1, the root portion of the driving pin 11b can meet the buffer member 5, and the top end portion of the driving pin 11b is connected to the rear blade in the blade room. The constitution of the rear blade will be explained below.

Also, the second rear blade-driving member 12 for the includes a locked part 12a and an opening portion 12b into which the engagement part 11a is inserted, and a roller 12c is rotatably fitted to of the second rear blade-driving member 12 on the upper-base-plate-7 side. And the second rear blade-driving member 12 is biased by a rear blade driving spring which is not shown in the drawing, so that the second rear blade-driving member 12 is clockwise rotated. Also, in the present embodiment, a setting spring which is not shown in the drawing is hooked on the second and first rear blade-driving members 12 and 11, so that the second and first rear blade-driving members 12 and 11 are biased so that the second rear blade-driving member 12 is clockwise rotated and the first rear blade-driving member 11 is counterclockwise rotated. However, in this kind of constitution as known in public, two springs may be used as setting spring so that the second rear blade-driving member 12 is biased by one of the two springs so as to rotate the second rear blade-driving member 12 clockwise and the first rear blade-driving member 11 is biased by the other of the two springs so as to rotate the first rear blade-driving member 11 counterclockwise.

A setting member 13 is rotatably fitted to the shaft 1i of the shutter base plate 1 and is biased by a spring which is not shown in the drawing so that the setting member 13 is rotated counterclockwise. And, a roller 13a which can come into contact with the roller 10b of the front blade driving member 10 and a roller 13b which can come into contact with the roller 12c of the second rear blade-driving member 12 are rotatably fitted to the surface of the setting member 13 on the shutter-base-plate-1 side.

A setting operation member 14 is rotatably fitted to the shaft 1j of the shutter base plate 1. A roller 14a which is operated by a member on the camera-body side is rotatably fitted to the setting operation member 14, and a shaft 14b is erectly provided on the surface of the setting operation member 14 on the shutter-base-plate-1 side. And, the setting operation member 14 is connected to the setting member 13 by a link member 15. That is to say, a hole is formed in one end of the link member 15, and the shaft 14b of the setting operation member 14 is rotatably fitted into the hole of the link member 15. Also, the other end of the link member 15 is provided with a pin 15a on the upper-base-plate-7 side, and the other end of the link member 15 is erectly provided with a shaft on the shutter-base-plate-1 side, with the shaft concentric with the pin 15a. And, the shaft of the link member 15 is rotatably fitted into a hole which is formed in the setting member 13.

Accordingly, the setting operation member 14 is associated with the counterclockwise rotation of the setting member 13 by the spring which is not shown in the drawing, so that the setting operation member 14 is counterclockwise rotated through the link member 15 and is then stopped by the buffer member 9 as a stopper, as shown in FIG. 1. Besides, when the roller 14a is pressed by the member on the camera-body side to rotate the setting operation member 14 clockwise in the set operation, the setting operation member 14 is used for rotating the setting member 13 clockwise through the link member 15. However, the setting member 13 may be clockwise rotated directly by a member on the camera-body side without providing the setting operation member 14 for the shutter base plate 1, in the set operation. In this case, as seen in the following explanation, the pin 15a which is provided for the link member 15 must be provided for the setting member 13.

A front blade locking member 16 is rotatably fitted to the shaft 1k of the shutter base plate 1 and is biased by a spring which is not shown in the drawing so that the front blade locking member 16 is rotated counterclockwise. The front blade locking member 16 includes a lock part 16a which is bent toward the shutter base plate 1, and the locked part 10a of the front blade driving member 10 is locked into the lock part 16a. The lock part 16a is used for preventing the clockwise rotation of the front blade driving member 10. Also, a pressed part 16b is provided on the upper end of a bend portion of the front blade locking member 16 which is bent toward the upper base plate 7, in such a way that the pressed part 16b furthermore protrudes toward the upper base plate 7. The pressed part 16b is inserted into an approximately rectangle-shaped hole 7c of the upper base plate 7 (refer to FIG. 3) so that the pressed part 16b is arranged between the upper base plate 7 and the cover 8.

A rear blade locking member 17 is rotatably fitted to the shaft 1m of the shutter base plate 1 and is biased by a spring which is not shown in the drawing so that the rear blade locking member 17 is rotated clockwise. The rear blade locking member 17 includes a lock part 17a which is bent toward the shutter base plate 1, and a pressed part 17b which is bent toward the upper base plate 7. And, the locked part 12a of the second rear blade-driving member 12 is locked into the lock part 17a. The lock part 17a is used for preventing the clockwise rotation of the second rear blade-driving member 12. Also, the top end of the pressed part 17b is located between the upper base plate 7 and the cover 8 on the lateral side of the upper base plate 7 and the cover 8, as shown in FIG. 3.

As shown in FIG. 3, a shaft 7d is erectly provided on the upper base plate 7 in such a way that the shaft 7d erects toward the cover 8, and a shaft 7e is erectly provided on the upper base plate 7 in such a way that the shaft 7e is concentric with the shaft 7d and erects toward the shutter base plate 1. An auxiliary setting member 18 is rotatably fitted to the shaft 7e. And, any spring is not hooked on the auxiliary setting member 18. Also, the auxiliary setting member 18 includes a pressing part 18a, a arc-shaped elongate hole 18b, and a large clearance hole 18c. The pin 15b of the link member 15 is inserted into the elongate hole 18b. As a result, the auxiliary setting member 18 is rotated counterclockwise when the setting member 13 is rotated clockwise, and then the auxiliary setting member 18 is rotated clockwise when the setting member 13 is rotated counterclockwise. Also, the pressed part 16b of the front blade locking member 16 is made to penetrate the clearance hole 18c so that the pressed 16b can be inserted into the hole 7c of the upper base plate 7, and in addition, the clearance hole 18c is formed in such a way that the clearance hole 18c does not interfere with the movement of the pressed part 16b. Besides, although the pin 15a of the link member 15 is shown in FIG. 3, the pin 15a is not shown in FIGS. 7 to 9 and FIG. 12 which are used for explaining the operation of the focal plane shutter.

Next, components which are arranged between the upper base plate 7 and the cover 8 will be explained mainly using FIG. 3. However, before explaining these components, the shape of the whole of the upper base plate 7 and shafts which are erectly provided on the upper base plate 7 and erect toward the cover 8 in order to fit these components to the upper base plate 7 are explained. First, the upper base plate 7 has a shape which is long in the vertical direction as a whole, as shown in solid lines in FIG. 3, and the right half part of the upper base plate 7 is formed as a coplanar area, while the left half part of the upper base plate 7 is formed as three protruding areas which protrude from the right half area toward the left side.

And, the middle protruding area of the left half part is formed so as to lie in the same plane as the right half part, while the upper and lower protruding areas of the left half part are made to have level differences from the right half part by providing bend portions 7f, 7g, and 7h and are formed so as to be higher than the middle protruding area to become nearer to the cover 8 than the middle protruding area. In addition, an elongate opening 7i having a special shape is formed between the two bend portions 7g and 7h. Furthermore, a bend portion 7j is formed on the right-upper area of the upper base plate 7, and a contact portion 7k is formed on the right-lower area of the upper base plate 7. The bend portion 7j is bent toward the shutter base plate 1 and functions as a stopper for the counterclockwise rotation of the above-described rear blade locking member 17.

Three shafts 7m, 7n, and 7r, together with the above-described shafts 7b and 7d, are erectly provided on the upper base plate 7 having such a shape in such a way that the three shafts are erect toward the cover 8. And, small-diameter portions which are formed in the top ends of the shafts 7d and 7r of these three shafts respectively are fitted into holes which are formed in the cover 8, respectively, so that the shafts 7d and 7r support the cover 8 with the ring-shaped level-difference surfaces of the top ends of shafts 7d and 7r. Also, two dowel pins 7p and 7q are erectly provided in the middle protruding area of the upper base plate 7 in such a way that the dowel pins erect toward the cover 8.

Next, components which are fitted to the upper base plate 7 will be explained. First, the dowel pins 7p and 7q are fitted into holes which are provided for the iron-core members 19a and 20a of an electromagnet 19 for the front blade and an electromagnet 20 for the rear blade, respectively, and then the electromagnets 19 and 20 are fitted to the upper base plate 7 through screws 21 and 22. The electromagnet 19 consists of: the iron-core member 19a which is shaped like the letter, "U" and the top ends of the tow legs of which are used as magnetic poles; and a bobbin 19c around which a coil 19b is wound and which is fitted to one of the legs of the iron-core member 19a, and the electromagnet 20 consists of: the iron-core member 20a which is shaped like the letter, "U" and the top ends of the two legs of which are used as magnetic poles; and a bobbin 20c around which a coil 20b is wound and which is fitted to one of the legs of the iron-core member 20a. As a result, the legs of the iron-core members 19a and 20a do not come into contact with the surface of the upper base plate 7 and are located over the upper base plate 7.

Also, a lock-releasing member 23 for the front blade is rotatably fitted to the shaft 7r of the upper base plate 7, and the lock-releasing member 23 is biased by a front blade releasing spring which is not shown in the drawing, so that the lock-releasing member 23 is clockwise rotated. The lock-releasing member 23 for the front blade includes a pressing portion 23a which presses the pressed part 16b of the front blade locking member 16, and an iron piece member 24 is fitted to a bend portion which is formed in the top end of the lock-releasing member 23 in a publically known manner. And, the iron piece member 24 is provided with a pressed part 24a which protrudes toward the right side of the bend portion of the lock-releasing member 23.

Also, a lock-releasing member 25 for the rear blade is rotatably fitted to the shaft 7b of the upper base plate 7, and the lock-releasing member 25 is biased by a rear blade releasing spring which is not shown in the drawing, so that the lock-releasing member 25 is counterclockwise rotated. The lock-releasing member 25 for the rear blade includes a pressing portion 25a which presses the pressed part 17b of the rear blade locking member 17, and an iron piece member 26 is fitted to a bend portion which is formed in the top end of the lock-releasing member 25. And, the iron piece member 26 is provided with a pressed part 26a which protrudes toward the right side of the bend portion of the lock-releasing member 25. Also, because it is difficult to clearly show the lock-releasing member 25 for the rear blade in FIG. 3, only the lock-releasing member 25 for the rear blade is shown in FIG. 4. As shown in FIG. 4, a restrained part 25b which runs toward the upper base plate 7 is formed on the bend portion of the lock-releasing member 25 to which the iron piece member 26 is fitted.

Also, a hold member 27 and an auxiliary hold member 28 are rotatably fitted to the shaft 7d of the upper base plate 7, and the hold member 27 is arranged nearer to the upper base plate 7 than the lock-releasing member 23 for the front blade Also, the hold member 27 is biased by a first spring which is not shown in the drawing, so that the hold member 27 is clockwise rotated. A second spring which is not shown in the drawing is hooked on the hold member 27 and the auxiliary hold member 28, so that the hold member 27 is biased by the second spring to be counterclockwise rotated and the auxiliary hold member 28 is biased by the second spring to be clockwise rotated. And, the relative relation between the hold member 27 and the auxiliary hold member 28 in FIG. 2 is such that the second spring is at the limit of the second spring capable of rotating the hold member 27 and the auxiliary hold member 28 in the different directions from each other by its biasing force and both of the hold member 27 and the auxiliary hold member 28 are clockwise rotated together by the biasing force of the first spring to be stopped.

Accordingly, in the state shown in FIG. 2, when the auxiliary hold member 28 is rotated counterclockwise, the hold member 27, together with the auxiliary hold member 28, is also rotated counterclockwise against the biasing force of the first spring. And then, when the force which rotates the auxiliary hold member 28 counterclockwise is lost, the hold member 27 and the auxiliary hold member 28 are clockwise rotated together by the biasing force of the first spring. In the case where the hold member 27 and the auxiliary hold member 28 are counterclockwise rotated together and then the rotation of the hold member 27 is stopped, only the counterclockwise rotation of the auxiliary hold member 28 can be continued somewhat with the second spring tensed. Besides, it is known in public that the hold member 27 and the auxiliary hold member 28 are formed in such a manner, and one concrete example of the formation is described in Japanese Patent Kokai No. 2007-34042 for example.

A shaft 27a is erectly provided on the top end of the hold member 27 and a publically known pressing member 29 is fitted to a shaft portion 27a of the shaft 27. The pressing member 29 includes two pressing portions 29a and 29b which are formed so as to run in the vertical direction in FIG. 3. The pressed parts 24a and 26a of the iron piece members 24 and 26 are pressed by the pressing portions 29a and 29b, so that the iron piece members 24 and 26 can be pressed to the iron-core member 19a and 20a. And, the pressing member 29 is fitted to the shaft 27a with a publically known constitution in such a way that the pressing member 29 can be rotated on the shaft 27a by a set angle in order to securely press the two iron piece members 24 and 26 to the iron-core members 19a and 20a. In addition, an engagement pin 27b for linking to the movement of a below-described restraining member 31 is erectly provided in the top end of the hold member 27 in such a way that the engagement pin 27b is located on the upper-base-plate-7 side. On the other hand, the top edge of the auxiliary hold member 28 passes through the opening 7i to be arranged on the back side of the upper base plate 7, so that a pressed part 28a which is bent toward the shutter base plate 1 can be pressed by the pressing part 18a of the auxiliary setting member 18.

Also, a release member 30 is rotatably fitted to the shaft 7m of the upper base plate 7, and the release member 30 is biased by a spring which is not shown in the drawing, so that the release member 30 is counterclockwise rotated. The release member 30 includes: a lock part 30a which is arranged on the top end of one arm of the release member 30; and a pressed part 30b and a contact part 30c which are arranged on the top end of the other arm of the release member 30. The release member 30 is arranged nearer to the upper base plate 7 than the auxiliary hold member 28. And, the lock part 30a passes through the opening 7i and the pressed part 28a of the auxiliary hold member 28 is locked into the lock part 30a on the back side of the upper base plate 7, so that the clockwise rotation of the auxiliary hold member 28 can be prevented. Also, the pressed part 30b is a part which is pressed by a member of the camera-body side which is not shown in the drawing, and the contact part 30c is a part which comes into contact with a contact part 7k that is formed in the upper base plate 7 when the release member 30 is rotated counterclockwise by the biasing force of a spring which is not shown in the drawing.

Also, the restraining member 31 is rotatably fitted to the shaft 7n of the upper base plate 7. And, the restraining member 31 includes: a restraining part 31a; a rotation stopping parts 31b and 31c which are formed on the both sides of the restraining part 31a; and an engagement part 31d which is formed so as to be bent toward the cover 8. As described above, the restraining member 31 is rotated in response to the movement of the hold member 27, and the existence of a connection spring 32 makes this rotation of the restraining member 31 possible. That is to say, the connection spring 32 is wound around the shaft 7n, and the biasing force of the connection spring 32 makes the long arms 32a and 32b at the both ends of the connection spring 32 pinch the engagement pin 27b of the hold member 27 and the above-described engagement part 31d.

Another member is arranged between the upper base plate 7 and the cover 8. That is to say, the cover 8 is provided with a bend part 8a which is arranged on the right side edge of the middle area in FIG. 3, is bent toward the upper base plate 7, and is formed so as to be elongate in the vertical direction, and a buffer member 33 which is shaped like an elongate rectangular solid and is made of rubber is fixed on the left side of the bend part 8a with cement. And, although the buffer member 33 is shown in FIG. 3 with a part of the buffer member 33 overlapping with the hold member 27 and the restraining member 31, the buffer member 33 is fixed to the bend part 8a with the buffer member 33 made to come near to the cover 8 in fact, so that the movements of the hold member 27 and the restraining member 31 are unaffected by the buffer member 33, and the buffer member 33 is arranged in such a way that only the pressing parts 29a and 29b of the pressing member 29 which is fitted to the hold member 27 can come into contact with the buffer member 33.

Next, components which are arranged on the back side of the shutter base plate 1 except the middle plate 2 and the auxiliary base plate 3 that were already explained will be explained using FIGS. 1 and 2. First, the front blade which is arranged between the shutter base plate 1 and the middle plate 2 consists of: two arms 33 and 34 one ends of which are pivotally fitted to the two shafts 1g and 1n which are erectly provided on the shutter base plate 1, respectively; and four blades 35, 36, 37, and 38 which are pivotally supported by the arms 33 and 34 in such a way that the four blades 35, 36, 37, and 38 are arranged in that order toward the free ends of the arms 33 and 34. The blade 38 which is pivotally supported nearest to the free ends of the arms 33 and 34 is used as a slit-forming blade. And, the driving pin 10c of the front blade driving member 10 is fitted into a publically known hole of the arm 33 and the arm 33 is provided with light intercepting parts 33a and 33b which are formed in the vicinity of a fitting portion of the arm 33 for the shaft 1g. Also, the relation between the arms 33 and 34 and the blades 35, 36, 37, and 38 in the case of the arms and blades overlapping with one another is such that the arms 33 and 34 are located nearest to the shutter base plate 1 and the blade 35 is located nearest to the middle plate 2.

Also, the rear blade which is arranged between the middle plate 2 and the auxiliary base plate 3 consists of: two arms 39 and 40 one ends of which are pivotally fitted to the two shafts 1h and 1p which are erectly provided on the shutter base plate 1, respectively; and four blades 41, 42, 43, and 44 which are pivotally supported by the arms 39 and 40 in such a way that the four blades 41, 42, 43, and 44 are arranged in that order toward the free ends of the arms 39 and 40. The blade 44 which is pivotally supported nearest to the free ends of the arms 39 and 40 is used as a slit-forming blade. And, the driving pin 11b of the first rear blade-driving member 11 is fitted into a publically known hole of the arm 39 and the arm 39 is provided with light intercepting parts 39a and 39b which are formed in the vicinity of a fitting portion of the arm 39 for the shaft 1h. Also, the relation between the arms 39 and 40 and the blades 41, 42, 43, and 44 in the case of the arms and blades overlapping with one another is such that the arms 39 and 40 are located nearest to the auxiliary base plate 3 and the blade 41 is located nearest to the middle plate 2.

Finally, two photoelectric sensors 45 and 46 which have the same constitution are fitted to areas in the vicinities of the shaft 1g and 1h on the back side of the shutter base plate 1, respectively. These photoelectric sensors 45 and 46 are called photointerrupter in general. Photointerrupters are formed in such a way that a light emitting part and a light detecting part are arranged so as to face toward each other and light emitting from the light emitting part is detected by the light detecting part. And, photointerrupters output a H (High)-signal when the light detecting part detects light, and photointerrupters output a L (Low)-signal when the light detecting part does not detect light. And, in the present embodiment, the light-intercepting parts 33a and 33b of the arm 33 can intercept the optical path of the photoelectric sensor 45, and the light-intercepting parts 39a and 39b of the arm 39 can intercept the optical path of the photoelectric sensor 46.

Next, the operation of the focal plane shutter of the present embodiment will be explained. As described above, the explanation of the operation of the focal plane shutter of the present embodiment relates to the case where: a still image is usually captured with an optical finder; shooting can be performed with a monitor when a photographer performs a selection operation before the shooting; and shooting for capturing a still image or shooting for capturing a moving image is selectively performed in the case where shooting is performed with the monitor. Accordingly, a digital camera into which the focal plane shutter of the present embodiment is integrated is considered to be provided with a selection switch in shooting in a shooting mode with monitor, a release button for capturing a still image, and a release button for capturing a moving image. First, the case where shooting is performed in a shooting mode with optical finder will be explained using FIGS. 1 to 3 together with FIGS. 5 to 10.

As already explained, FIGS. 1 to 3 show the state of the focal plane shutter immediately after the termination of the exposure operation. In this case, the setting member 13 which is shown in FIGS. 1 and 2 is biased by the spring which is not shown in the drawings, so that the setting member 13 is rotated counterclockwise. The setting operation member 14 which moves in response to the movement of the setting member 13 comes into contact with the buffer member 9, so that this state of the setting member 13 stopping is kept. Hereinafter, this stopping position of the setting member 13 is called initial position. Also, in this case, the driving pins 10c and 11b of the front blade driving member 10 and the first rear blade-driving member 11 is made to meet the buffer members 4 and 5 respectively, so that the clockwise rotations of the front blade driving member 10 and the first rear blade-driving member 11 are prevented. As a result, the four blades 35 to 38 of the front blade are in a state in which an amount with which the four blades 35 to 38 overlap with one another becomes a maximum one, and the four blades 35 to 38 are stored in the lower area of the opening 1a. In addition, the four blades 41 to 44 of the rear blade close the opening 1a in a state in which the four blades 41 to 44 are spread with the minimum amount with which the four blades 41 to 44 overlap with one another.

Also, in this case, the hold member 27 and the auxiliary hold member 28 are biased by the above-described first spring which is not shown in the drawings, so that the hold member 27 and the auxiliary hold member 28 are rotated clockwise. However, as shown in FIG. 3, the pressed part 28a of the auxiliary hold member 28 comes into contact with the pressing part 18a of the auxiliary setting member 18, so that the counterclockwise rotations of the hold member 27 and the auxiliary hold member 28 are prevented. Also, in this case, the engagement pin 27b of the hold member 27 presses the arm 32b of the connection spring 32, so that the engagement part 31d is pressed by the other arm 32a of the connection spring 32, and the restraining member 31 is in a state in which the restraining member 31 is stopped at the position at which the counterclockwise rotation angle of the restraining member 31 becomes the maximum one.

In addition, the lock-releasing member 23 for the front blade is rotated clockwise by the biasing force of the front blade releasing spring which is not shown in the drawing, so that the iron piece member 24 is separated from the iron-core member 19a of the electromagnet 19 for the front blade, and then the lock-releasing member 23 for the front blade is stopped with the pressed part 23a pressing the pressed part 16b of the front blade locking member 16 to the edge of the hole 7c of the upper base plate 7. Also, the lock-releasing member 25 for the rear blade is rotated counterclockwise by the biasing force of the rear blade releasing spring which is not shown in the drawing, so that the iron piece member 26 is separated from the iron-core member 20a of the electromagnet 20 for the rear blade, the pressed part 25a presses the pressed part 17b of the rear blade locking member 17, and then the lock-releasing member 25 for the rear blade is stopped with the pressed part 25a pressing the rear blade locking member 17 to the bend portion 7j of the upper base plate 7.

When the exposure operations of the front and rear blades are finished and the front and rear blades are in such a state, image information is transferred from an image sensor through an information processing circuit, and then the set operation of the focal plane shutter is performed immediately after the image information is stored in a memory. In the present embodiment, the roller 14a of the setting operation member 14 is pressed by a member on the camera-body side which is not shown in the drawings and the setting operation member 14 is rotated clockwise, so that the set operation is performed. When the setting operation member 14 is rotated clockwise in FIG. 2, the setting member 13 responds to the clockwise rotation of the setting operation member 14 to be rotated clockwise against the biasing force of a spring which is not shown in the drawing. As a result, the open and close operating mechanism is set in its set state by the two rollers 13a and 13b of the setting member 13, while the auxiliary setting member 18 is counterclockwise rotated by the pin 15a of the link member 15 in FIG. 3 so that the lock releasing mechanism is set in its set state. And, these set operations are performed in parallel to each other. As a matter of convenience for explanation, the set operation of the open and close operating mechanism will be first explained.

First, when the clockwise rotation of the setting member 13 is started in FIG. 2, the roller 13a first presses the roller 10b of the front blade driving member 10, so that the front blade driving member 10 is rotated counterclockwise against the biasing force of the front blade driving spring which is not shown in the drawing. As a result, the four blades 35 to 38 for the front blade which are stored in the lower area of the opening 1a are moved upward while amounts with which the blades adjacent to each other overlap with each other are being decreased and the slit-forming blade 38 is heading the four blades 35 to 38. And, when an amount with which the slit-forming blade 38 of the front blade overlaps with the slit-forming blade 44 of the rear blade reaches a set amount, the roller 13b of the setting member 13 begins to press the roller 12c of the second rear blade-driving member 12, so that the second rear blade-driving member 12 is rotated counterclockwise against the biasing force of the rear blade driving spring which is not shown in the drawing.

Also, as described above, the setting spring which is not shown in the drawings is hooked on the first rear blade-driving member 11 and the second rear blade-driving member 12 so that the first and second rear blade-driving members 11 and 12 are biased by the setting spring, so that the first rear blade-driving member 11 is rotated counterclockwise and the second rear blade-driving member 12 is rotated clockwise. As a result, when the second rear blade-driving member 12 is rotated counterclockwise by the setting member 13 in the above-described manner, the engagement part 11a of the first rear blade-driving member 11 follows the edge of the opening 12b of the second rear blade-driving member 12, so that the first rear blade-driving member 11 also is rotated counterclockwise. As a result, the four blades 41 to 44 for the rear blade are moved upward while amounts with which the blades adjacent to each other overlap with each other are being decreased, from this point in time. And, afterward, the front and rear blades continue their movements while a amount with which the slit-forming blades overlap with each other is being kept good.

The set operation performed in such a manner goes on, so that the four blades 35 to 38 for the front blade are spread to cover the opening 1a, and the four blades 41 to 44 for the rear blade overlap with one another to be stored in the upper area of the opening 1a. At this stage, the driving pin 11b of the first rear blade-driving member 11 meets the upper edge of the arc-shaped elongate hole 1c which is formed in the shutter base plate 1, so that the first rear blade-driving unit 11 is stopped.

And, the front blade driving member 10 and the second rear blade-driving member 12 continue to slightly rotate counterclockwise afterward, so that the four blades 35 to 38 for the front blade also continue to move upward, while the four blades 41 to 44 for the rear blade keep stopping. As a result, the setting spring which is hooked on the first and second rear blade-driving members 11 and 12 is tensed. That is to say, because the present embodiment makes it possible to perform such movements of the components, even though the second rear blade-driving member 12 is rotated further afterward, the four blades 41 to 44 for the rear blade is not involved in the further rotation of the second rear blade-driving member 12 to move further upward. As a result, a space for storing the rear blade, or the distance between the upper edges of the opening 1a and of the shutter base plate 1 may be small, so that it possible to arrange members on the camera-body side which are not shown in the drawings, such as optical finder, as advantageously as possible. Accordingly, in the case where there is no necessity to use such a constitution, the first and second rear blade-driving members 11 and 12 may be formed as one member.

As described above, when the front blade driving member 10 and the second rear blade-driving member 12 are rotated counterclockwise further even after the rotation of the first rear blade-driving member 11 is stopped, the locked part 10a of the front blade driving member 10 presses the lock part 16a which already exists in the trajectory of the movement of the locked part 10a at this stage (the reason why the lock part 16a does so can be understood by the below-described explanation of the set operation of the lock-releasing mechanism), so that the front blade driving member 10 makes the lock-releasing member 16 for the front blade begin to slightly rotate clockwise against the biasing force of the spring which is not shown in the drawings. And, when the front blade driving member 10 is rotated yet further to release the locked part 10a from the contact between the locked part 10a and the lock part 16a, the front blade locking member 16 is rotated counterclockwise by the biasing force of the spring which is not shown in the drawings, so that the front blade locking member 16 reaches a state in which the locked part 10a can be locked into the lock part 16a.

Figure 5:
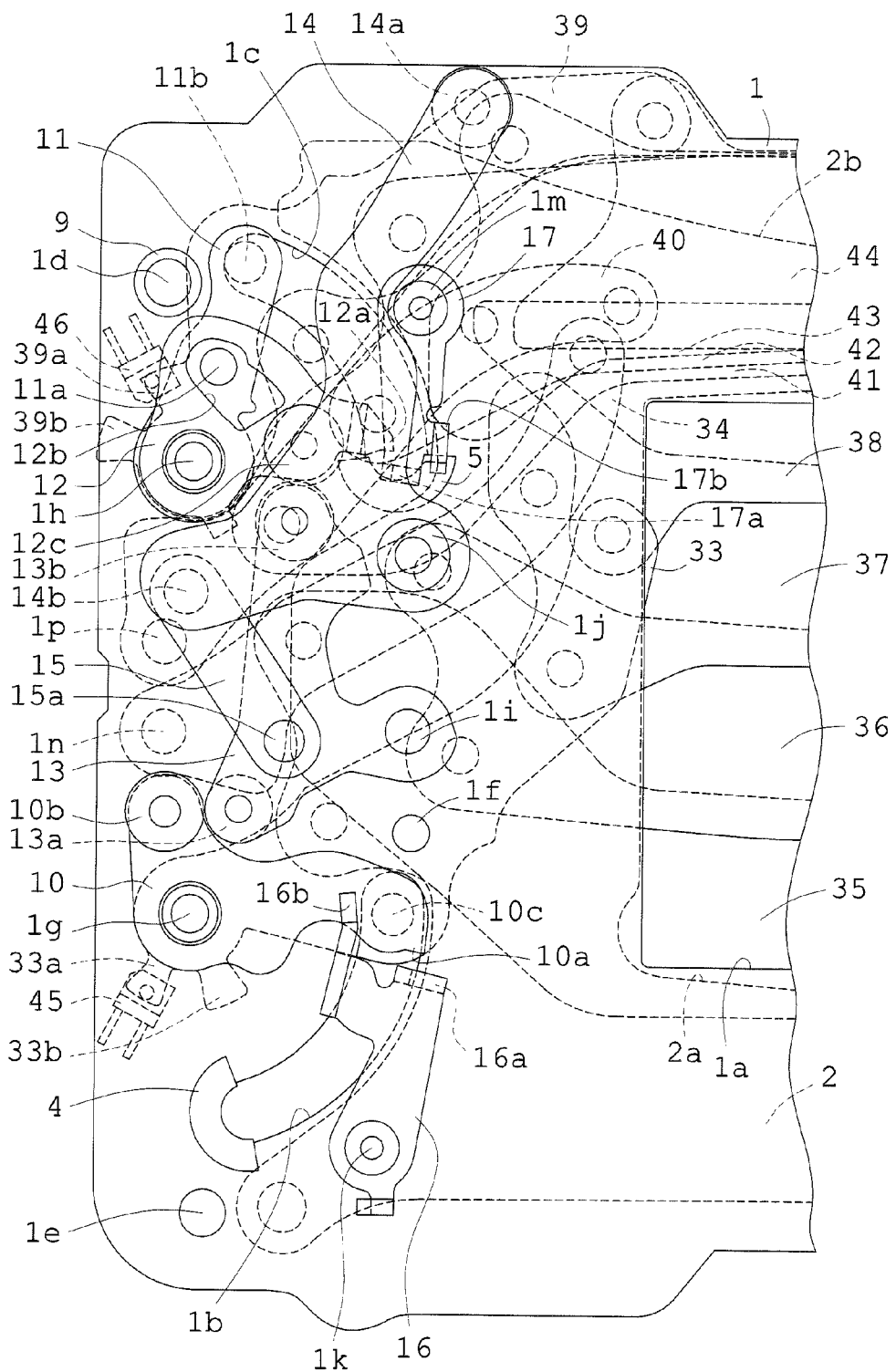
FIG. 5 is a plan view showing the over-set state of the open and close operating mechanism shown in FIG. 2.

On the other hand, at the stage where the locked part 10a of the front blade driving member 10 presses the lock part 16a of the front blade locking member 16 as described above, the locked part 12a of the second rear blade-driving member 12 also presses the lock part 17a which already exists in the trajectory of the movement of the locked part 12a (the reason why the lock part 17a does so can be understood by the below-described explanation of the set operation of the lock-releasing mechanism), so that the second rear blade-driving member 12 makes the rear blade locking member 17 begin to rotate counterclockwise against the biasing force of the spring which is not shown in the drawings. And, when the second rear blade-driving member 12 is rotated yet further to release the locked part 12a from the contact between the locked part 12a and the lock part 17a, the rear blade locking member 17 is rotated clockwise by the biasing force of the spring which is not shown in the drawings, so that the lock-releasing member 17 for the rear blade reaches a state in which the locked part 12a can be locked into the lock part 17a. And, the clockwise rotation of the setting operation member 14 by the member on the camera-body side is stopped at this stage. The state at a point in time is the over set state of the focal plane shutter of the present embodiment which is shown in FIG. 5.

When the focal plane shutter of the present embodiment reaches the over set state, the member on the camera-body side which is not shown in the drawings separates from the roller 14a of the setting operation member 14. As a result, the setting member 13 can be rotated counterclockwise by the biasing force of the spring which is not shown in the drawings, so that the setting member 13 returns to its initial position while rotating the setting operation member 14 counterclockwise through the link member 15.

Figure 6:
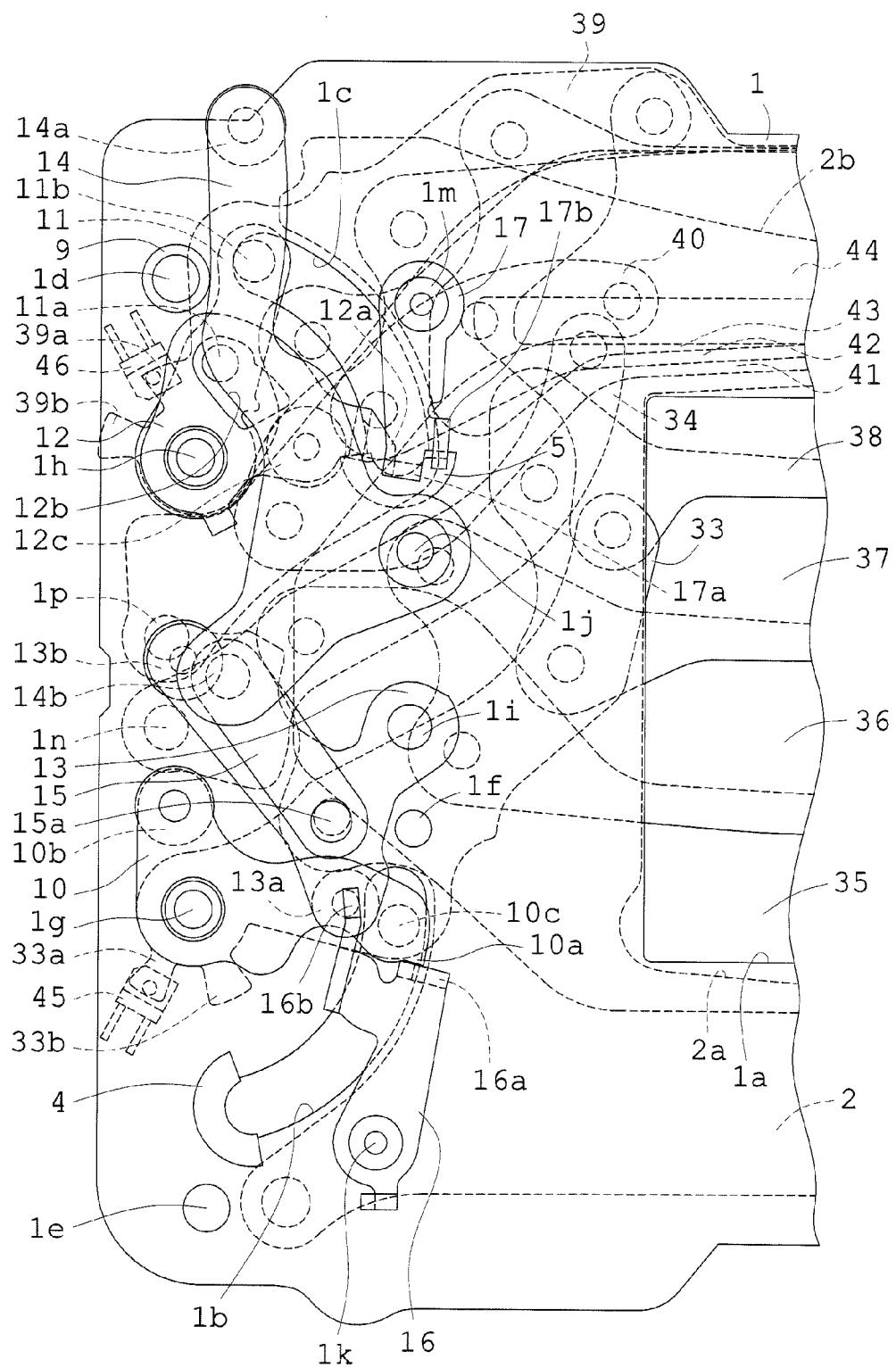
FIG. 6 is a plan view showing the set termination state of the open and close operating mechanism shown in FIG. 2.

On the other hand, this counterclockwise rotation of the setting member 13 releases the rollers 10b and 12c of the two blade-driving members 10 and 12 from the pressing forces of the rollers 13a and 13b of the setting member 13 to the roller 10b and 12c, so that the two blade-driving members 10 and 12 are rotated clockwise by the biasing forces of the springs which are not shown in the drawings, respectively. However, when both of the two blade-driving members 10 and 12 are slightly rotated, the locked parts 10a and 12a of the blade-driving members 10 and 12 are locked into the lock parts 16a and 17a of the above-described blade locking members 16 and 17 respectively, so that the rotations of both of the two blade-driving members 10 and 12 are stopped. Also, although the slight rotations of the two blade-driving members 10 and 12 make the four blades 35 to 38 for the front blade slightly move downward, there is no situation where a part of the opening 1a is opened by the slight downward movements of the four blades 35 to 38. And then, when the setting member 13 is stopped at its initial position, the set operation is finished. FIG. 6 shows this set termination state, or the shooting-standby state of the focal plane shutter in the case of shooting in a shooting mode with optical finder.

Next explanation is relates to the case where the lock-releasing mechanism is set in its set state by the pin 15a of the link member 15 when the setting member 13 is rotated clockwise in the set operation against the biasing force of the spring which is not shown in the drawings. When the setting member 13 is rotated clockwise in FIG. 2, the width-directional edge of the elongate hole 18b of the auxiliary setting member 18 is pressed by the pin 15a of the link member 15, so that the auxiliary setting member 18 which is shown in FIG. 3 is rotated counterclockwise, the pressing part 18a of the auxiliary setting member 18 presses the pressed part 28a of the auxiliary hold member 28, and the hold member 27 and the auxiliary hold member 28 are rotated counterclockwise against the biasing force of the first spring which is not shown in the drawings.

As a result, the pressing member 29 which is fitted on the top end of the hold member 27 presses the pressed parts 24a and 26b of the iron piece members 24 and 26 through the pressing parts 29a and 29b of the pressing member 29, so that the lock-releasing member 23 for the front blade is rotated counterclockwise and the lock-releasing member 25 for the rear blade is rotated clockwise against the biasing forces of the springs which are not shown in the drawings, respectively. Also, the pressing parts 23a and 25a of the two lock-releasing members 23 and 25 are involved in these rotations of the two lock-releasing members 23 and 25 respectively to release the pressed parts 16b and 17b of the first and rear blade locking members 16 and 17 from the pressing forces of the pressing parts 23a and 25a to the pressed parts 16b and 17b, so that the blade-locking members 16 and 17 are rotated by the biasing forces of the springs which are not shown in the drawings, respectively. As a result, as described in the above explanation of the operation of the open and close operating mechanism, the lock parts 16a and 17a reach states in which the lock parts 16a and 17a exist in the trajectories of the movements of the locked parts 10a and 12a of the blade driving members 10 and 12, respectively. And, the pressed parts 16a and 17a finally meet the edges of the upper base plate 7, so that these rotations of the blade-locking members 16 and 17 are stopped.

Also, when the hold member 27 is rotated counterclockwise from the state in FIG. 3 in the above-described manner, the engagement pin 27b which is provided on the top end of the hold member 27 presses the arm 32a of the connection spring 32, so that the other arm 32b of the connection spring 32 presses the engagement part 31d of the restraining member 31. As a result, the restraining member 31 is rotated clockwise. And, as a result of the above-described rotations of the lock-releasing members 23 and 25 for the front and rear blades, the rotation-stopping part 31b of the restraining member 31 comes into contact with the restrained part 25b of the lock-releasing member 25 for the rear blade just before the iron piece members 24 and 26 come into contact with the iron-core members 19a and 20a of the electromagnets 19 and 20 for the front and rear blades respectively. Accordingly, afterward, the arm 32a of the connection spring 32 moves away from the engagement part 31d of the restraining member 31, so that the connection spring 32 is tensed.

And then, the iron piece members 24 and 26 come into contact with the iron-core members 19a and 20a of the electromagnets 19 and 20 for the front and rear blades respectively. As a result, the rotations of the lock-releasing members 23 and 25 for the front and rear blades are stopped, and the hold member 27 cannot be rotated counterclockwise further from the present state. However, also afterward, the pressed part 28a of the auxiliary hold member 28 is pressed by the pressing part 18a of the auxiliary setting member 18, so that when the auxiliary hold member 18 is slightly rotated while tensing the second spring which is hooked on the hold member 27 and the auxiliary hold member 28, the auxiliary hold member 28 is stopped.

On the other hand, after the iron piece members 24 and 26 come into contact with the iron-core members 19a and 20a respectively as described above, it becomes possible to perform the rotation of the release lever 30 which is prevented by the pressed part 28a of the auxiliary hold member 28 up to now, and the release lever 30 is rotated counterclockwise by the biasing force of the spring which is not shown in the drawings, so that the contact part 30c of the release member 30 meets the contact part 7k of the upper base plate 7 to stop the counterclockwise rotation of the release lever 30. As a result, the lock part 30a of the release member 30 moves into the trajectory of the movement of the pressed part 28a of the auxiliary hold member 28 to reach a state in which the lock part 30a can prevent the auxiliary hold member 28 from rotating clockwise. A state in which the rotation of the auxiliary hold member 18 is stopped and the lock-releasing mechanism is in such a state corresponds to the over set state which is explained in the above explanation of the set operation of the open and close operating mechanism.

When the release member 30 is made to return from this over set state to its initial position, as described above, the auxiliary setting member 18 is also rotated clockwise, so that the auxiliary hold member 28 is also rotated clockwise by the biasing force of the second spring which is hooked on the hold member 27 and the auxiliary hold member 28 and is not shown in the drawings. However, when the auxiliary hold member 28 is slightly rotated, the pressed part 28a of the auxiliary hold member 28 is locked into the lock part 30b of the release member 30, so that this rotation of the auxiliary hold member 28 is stopped.

Figure 7:
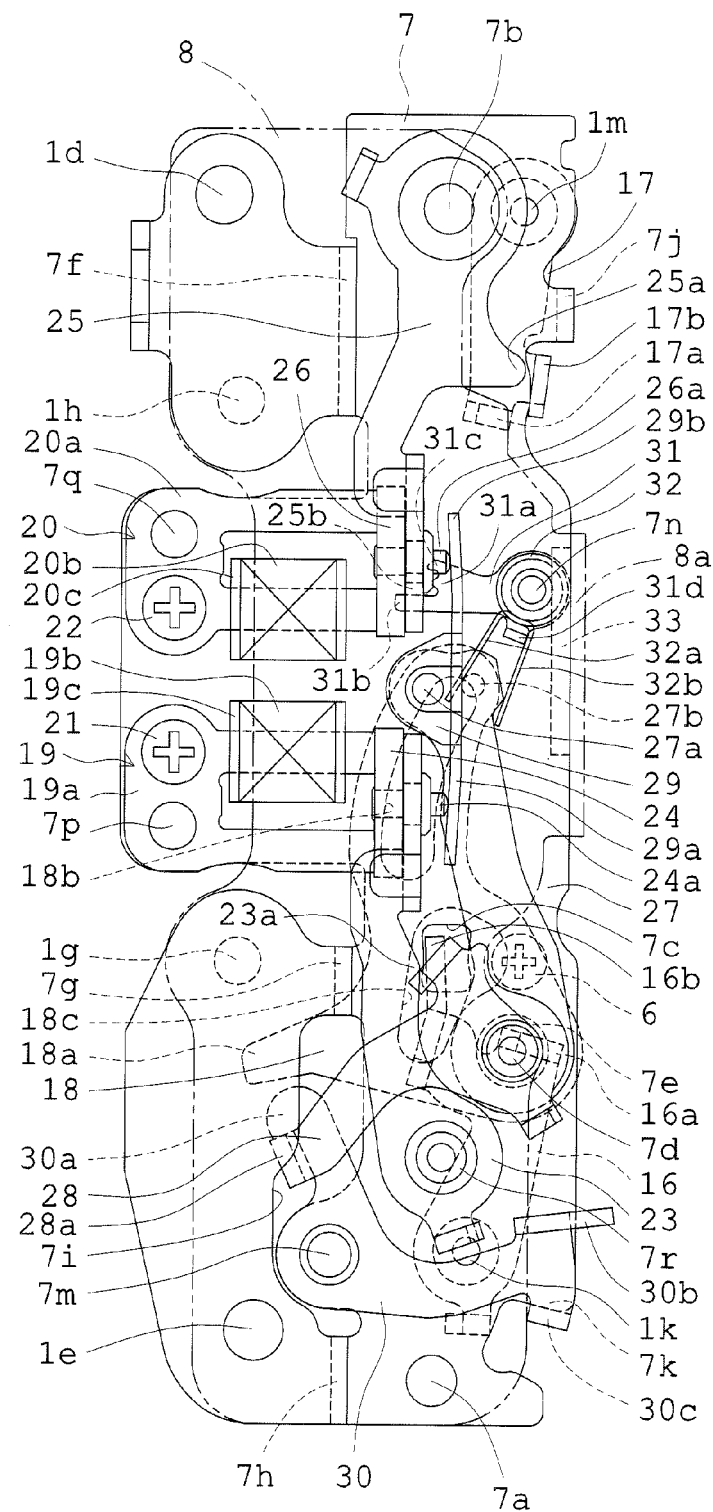
FIG. 7 is a plan view showing the set termination state of the lock-releasing mechanism shown in FIG. 3.

And, because the rotation of the auxiliary hold member 28 in this point in time is performed in the range of the action of the biasing force of the second spring which is hooked on the hold member 27 and the auxiliary hold member 28 and is not shown in the drawings, the hold member 27 is not rotated, and the pressing parts 29a and 29b of the pressing member 29 still keep making the iron piece members 24 and 26 come into contact with the iron-core members 19a and 20a respectively, and, in addition, the rotation stopping part 31b of the restraining member 31 also comes into contact with the restrained part 25b of the lock-releasing member 25 for the rear blade. This state corresponds to the set termination state of the lock-releasing mechanism which is shown in FIG. 7, or a shooting-standby state in shooting in a shooting mode with optical finder.

As already explained, a digital camera which is provided with the focal plane shutter of the present embodiment is provided with a selection switch in shooting in a shooting mode with monitor, a release button for capturing a still image, and a release button for capturing a moving image. And, the release button for capturing a moving image is locked when a shooting mode with a monitor is not selected by operating the selection switch, so that the release button for capturing a moving image cannot be pressed. As a result, when the set operation is performed in the above-described manner and the focal plane shutter is in the set termination state shown in FIGS. 6 and 7, or the shooting-standby state in a shooting mode with optical finder, the release button for capturing a moving image cannot be pressed. Also, because the photoelectric sensors 45 and 46 are electrified since the switch of the camera was turned on, the optical paths of both of the photoelectric sensors 45 and 46 are intercepted by the light-intercepting parts 33a and 39a of the arms 33 and 39 respectively in the set termination state, and both of the photoelectric sensors 45 and 46 output a L-signal.

In such a state of the focal plane shutter, when a photographer presses the release button for capturing a still image while observing an object with an optical finder, a movable mirror is first tipped up to draw apart from a optical path for shooting, while the coils 19b and 20b of the electromagnets 19 and 20 for the front and rear blades are electrified. As a result, the iron piece materials 24 and 26 which have been made to merely come into contact with the iron-core members 19a and 20a respectively up to now are attracted by the iron-core members 19a and 20a through their electromagnetic forces. And then, next, a member on the camera-body side which is not shown in the drawings presses the pressed part 30b of the release member 30, so that the release member 30 is rotated clockwise in FIG. 7 to release the auxiliary hold member 28 from the lock part 30a into which the auxiliary hold member 28 is locked.

After the auxiliary hold member 28 the pressed part 28a of which is released from the lock part 30a is rotated very slightly by the biasing force of the second spring which is not shown in the drawings, the auxiliary hold member 28, together with the hold member 27, is rotated clockwise by the biasing force of the first spring which is not shown in the drawings, and the pressed part 28a of the auxiliary hold member 28 meets the pressing part 18a of the auxiliary setting member 18, so that the auxiliary hold member 28 is stopped. In this process, the following operation is performed in response to the movement of the hold member 27. When the hold member 27 begins to rotate clockwise, the pressing parts 29a and 29b of the pressing member 29 separate from the pressed parts 24a and 26a of the iron piece members 24 and 26 respectively. However, as described above, the iron piece materials 24 and 26 are already attracted by the iron-core members 19a and 20a respectively, so that the lock-releasing members 23 and 25 for the front and rear blades are not rotated by the biasing forces of the springs which are not shown in the drawings, respectively, and the lock-releasing members 23 and 25 keep in states as shown in FIG. 7 temporarily.

Also, this clockwise rotation of the hold member 27 releases the tension in the connection spring 32 the one arm 32a of which comes into contact with the engagement pin 27b of the hold member 27, and then the engagement pin 27b begins to press the other arm 32b of the connection spring 32. As a result, the arm 32a presses the engagement part 31d of the restraining member 31, so that the restraining member 31 is rotated counterclockwise. Accordingly, the restraining part 31a of the restraining member 31 is made to escape to the outside of the trajectory of the movement of the restrained part 25b of the lock-releasing member 25 for the rear blade.

Figure 8:
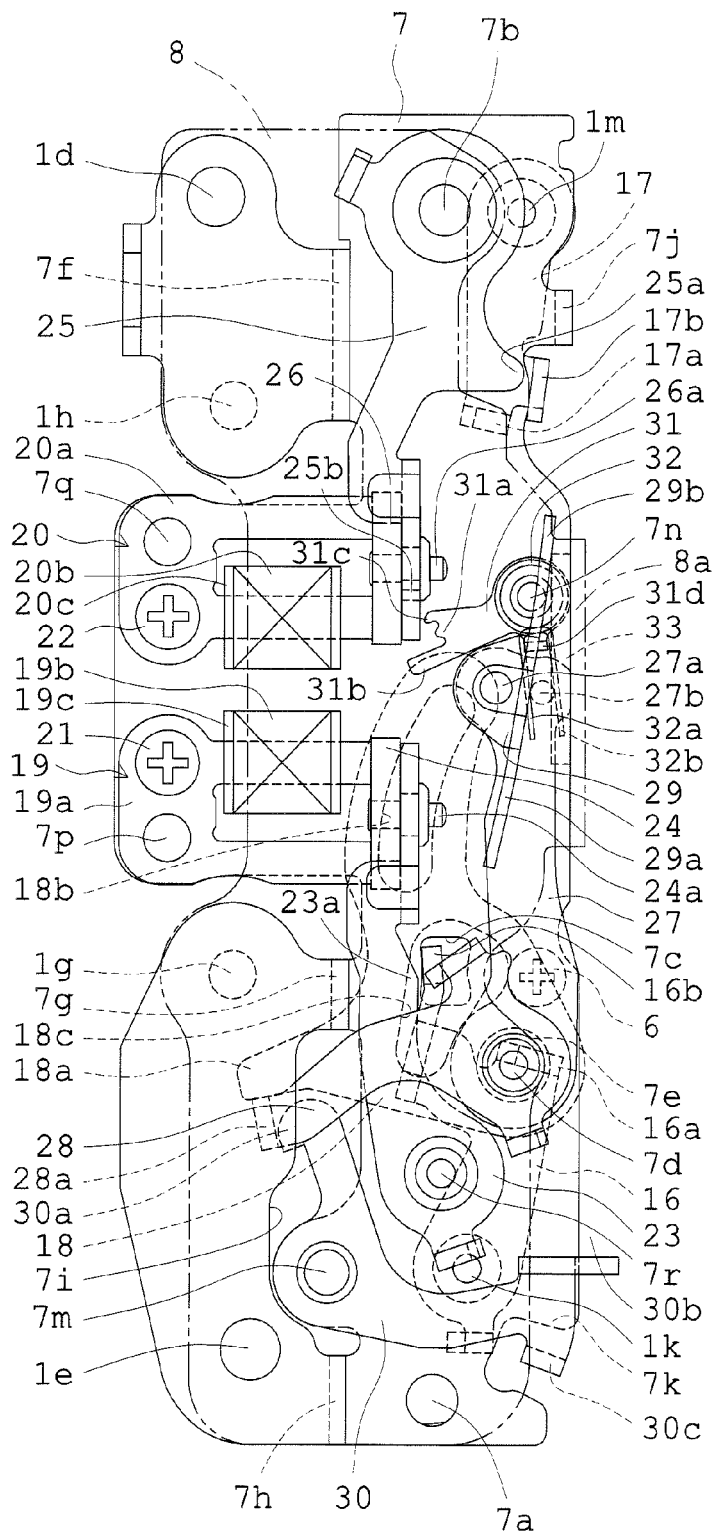
FIG. 8 is a plan view showing a phenomenon which is made to occur by the lock-releasing mechanism shown in FIG. 3, immediately after a release of a camera.

And, as described above, this rotation of the hold member 27 is stopped by the contact between the pressed part 28a of the auxiliary hold member 28 and the pressing part 18a of the auxiliary setting member 18. At this point in time, the pressing member 29 which is fitted to the hold member 27 vibrates while leaning largely around the shaft 27a. However, in the present embodiment, the buffer member 33 which is made of rubber is fixed to the bend part 8a of the cover 8. Accordingly, when the pressing member 29 leans, either of the pressing parts 29a and 29b meets the buffer member 33, so that the vibration of the pressing member 29 stops early. FIG. 8 shows a state in which the pressing part 29b of the pressing member 29 meets the buffer member 33 because the pressing portion 29 leans. Also, FIG. 9 shows a state in which the pressing member 29 stands still while being in an ideal position, afterward.

Figure 9:
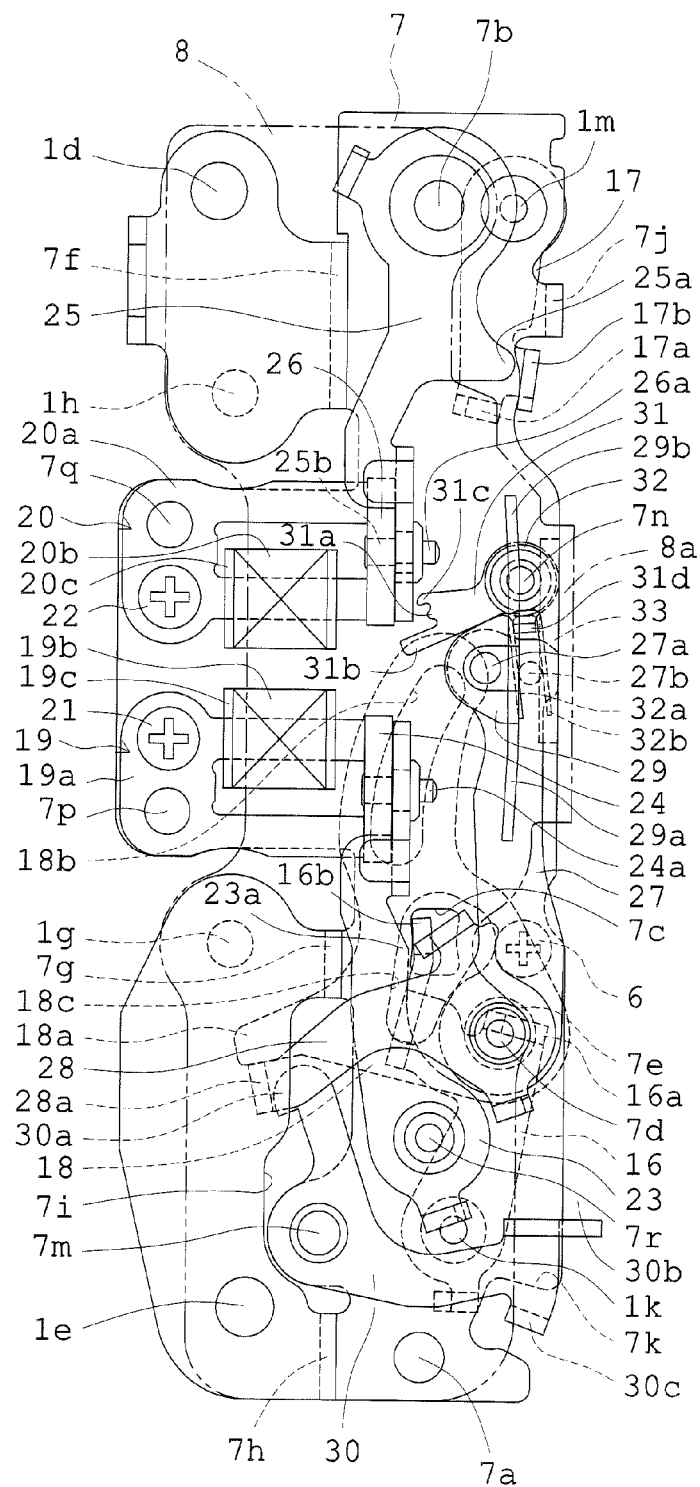
FIG. 9 is a plan view showing the state of lock-releasing member immediately after the state shown in FIG. 8.
Figure 10:
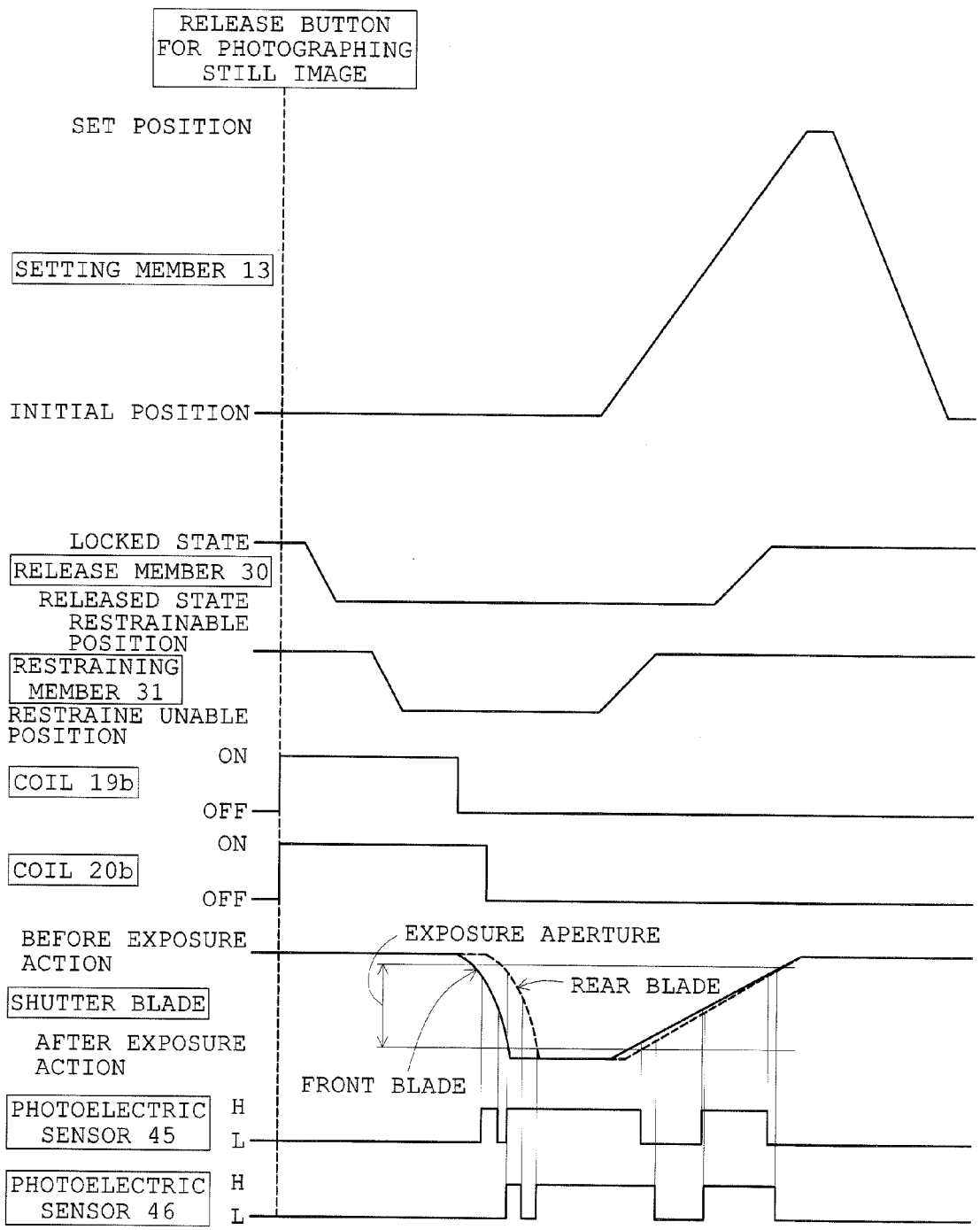
FIG. 10 is a timing chart showing the relation between the operations of main components of the focal plane shutter in the case where a still image is captured with a shooting mode with optical finder.

When the focal plane shutter reaches the state which is shown in FIG. 9 in such a manner, next, the supply of electric current to the coil 19b of the electromagnets 19 for the front blade is cut off. As a result, the attraction to the iron piece member 24 is lost, so that the lock-releasing member 23 for the front blade is rotated clockwise by the biasing force of the spring which is not shown in the drawings, and, in this process, the pressing part 23a presses the pressed part 16b for the front blade locking member 16. Accordingly, the front blade locking member 16 is rotated clockwise against the biasing force of the spring which is not shown in the drawings, so that the front blade locking member 16 releases the front blade driving member 10 from the lock part 16a into which the front blade driving member 10 is locked up to now. And then, the pressing part 23a of the lock-releasing member 23 of the front blade presses the pressed part 16b of the front blade locking member 16 to the edge of the hole 7c which is formed in the upper base plate 7, so that the rotation of the lock-releasing member 23 for the front blade is stopped afterward.

Now, in the present embodiment, when the clockwise rotation of the hold member 27 is stopped, the pressing member 29 vibrates while leaning largely, as described above. Accordingly, the buffer member 33 is provided for the focal plane shutter of the present embodiment in order to stop the vibration of the pressing member 29 early. However, in the case where the buffer member 33 is not provided for the focal plane shutter, the pressing member 29 cannot be stopped early even after the rotation of the hold member 27 is stopped. Accordingly, afterward, if the pressed part 24a of the iron piece member 24 meets the pressing part 29a of the pressing member 29 which rotates clockwise by chance before the supply of the electric current to the coil 19b of the electromagnets 19 for the front blade is cut off and then the lock-releasing member 23 for the front blade is rotated clockwise to release the front blade driving member 10 from the front blade locking member 16, this contact between the pressed part 24a and the pressing part 29a makes the timing of the release of the front blade driving member 10 from the front blade locking member 16 later than a set timing.

Also, in this case, when the pressed part 24a of the iron piece member 24 meets the pressing part 29a of the pressing member 29, the pressing member 29 does not always lean in the same manner, so that the difference in the timing of the release of the front blade driving member 10 from the front blade locking member 16 varies as often as shooting is performed. As a result, the timing of the release of the front blade driving member 10 from the front blade locking member 16 does not become regular, so that when an object which is in the same state is shot more than one time, obtained pictures are not necessarily shot in the same exposure state, and a matter which is so-called "cut unevenness" occurs.

Also, in order to avoid such a matter without providing the buffer member 33 for the focal plane shutter as in the present embodiment, the focal plane shutter should be formed in such a way that a length of time between the release of the auxiliary hold member 28 from the release member 30 and the cut in the supply of the electric current to the coil 19b of the electromagnets 19 for the front blade is lengthened. However, such a constitution causes a long length of time between the press of release button for capturing a still image and the actual start of the exposure operation of the front blade, so that the fear of missing the right moment to take a picture becomes large in the case where an object moves. In the present embodiment, the buffer member 33 is provided for the focal plane shutter to prevent the occurrence of such a matter.

When the locked part 10a of the front blade driving member 10 is released from the lock part 16a of the front blade locking member 16 in such a manner in the state shown in FIG. 6, the front blade driving member 10 is speedily rotated clockwise by the biasing force of the front blade driving spring which is not shown in the drawings. As a result, the four blades 35 to 38 for the front blade move to the lower portion of the opening 1a while the overlaps between the blades adjacent to each other are being increased, so that the opening 1a is opened through the upper edge of the slit-forming blade 38. And, as known in public, in the case of shooting a dark object or shooting an object with flash, the four blades 35 to 38 for the front blade fully open the opening 1a, and then the two rear blade-driving members 11 and 12 are rotated clockwise. However, the operation of the focal plane shutter after the start of the exposure operation of the front blade in the above-described manner will be explained in a situation where an object to be shot is bright and the object is shot without flash.

In the above-described manner, after a set length of time after the cut in the supply of electric current to the coil 19b of the electromagnets 19 for the front blade, the supply of electric current to the coil 20b of the electromagnet 20 for the rear blade is cut off. As a result, the attraction to the iron piece member 26 is lost, so that the lock-releasing member 25 for the rear blade is rotated counterclockwise by the biasing force of the spring which is not shown in the drawings, and, in this process, the pressing part 25a presses the pressed part 17b of the rear blade locking member 17. Accordingly, the rear blade locking member 17 is rotated counterclockwise against the biasing force of the spring which is not shown in the drawings, so that the rear blade locking member 17 releases the rear blade driving member 12 from the lock part 17a into which the rear blade driving member 12 is locked up to now. And then, the pressing part 25a of the lock-releasing member 25 for the rear blade presses the rear blade locking member 17 to the bend part 7j which is formed in the upper base plate 7, so that the rotation of the lock-releasing member 25 for the rear blade is stopped afterward.

When the second rear blade driving member 12 is released from the rear blade locking member 17 in such a manner, the second rear blade driving member 12 is speedily rotated clockwise from the state shown in FIG. 6, by the biasing force of the rear blade driving spring which is not shown in the drawings. In the initial stage of this operation, the edge of the opening 12b presses the engagement part 11a of the first rear blade-driving member 11, so that the first rear blade-driving member 11 also begins to rotate clockwise. Accordingly, the two blade-driving members 11 and 12 integratedly rotate clockwise afterward. And, when the first rear blade-driving member 11 begins to rotate clockwise, the four blades 41 to 44 for the rear blade move into the opening 1a while the overlaps between the blades adjacent to each other are being decreased, so that the opening 1a is closed from the upper side of the opening 1a through the lower edge of the slit-forming blade 44. As a result, the slit which is formed between the slit-forming blades 38 and 44 for the front and rear blades exposes light to the imaging plane of an image sensor from the top of the imaging plane to the bottom of the imaging plane, afterward.

Now, in the case of the present embodiment, the shape of the middle plate 2 is different from those in prior art. That is to say, as already explained, the outline-forming edge of the middle plate 2 on the side on which the four blades 41 to 44 for the rear blade are made to overlap with one another to be stored is shaped like an arc which becomes convex toward the exposure aperture, or the opening 1a. Accordingly, in the set termination state which is shown in FIG. 6, the middle plate 2 is formed in such a way that an amount with which the four blades 41 to 44 for the rear blade overlap with the middle plate 2 becomes small in the approximately middle area of the blades in the direction of the length of these blades. Accordingly, the reason why the middle plate 2 of the present embodiment has such a shape will be explained here.

In the case where the front blade is arranged between the shutter base plate 1 and the middle plate 2 and the rear blade is arranged between the middle plate 2 and the auxiliary base plate 3 as in the present embodiment, a space between the shutter base plate 1 and the middle plate 2 requires the largest distance in the space in a portion of the space in which the four blades 35 to 38 for the front blade overlap with one another, and a space between the middle plate 2 and the auxiliary base plate 3 requires the largest distance in the space in a portion of the space in which the four blades 41 to 44 for the rear blade overlap with one another, as known in public. That is to say, in the present embodiment, the blade room between the shutter base plate 1 and the middle plate 2 requires the largest distance in the space in the lower side of the opening 1a, and the blade room between the middle plate 2 and the auxiliary base plate 3 requires the largest distance in the space in the upper side of the opening 1a.

However, in accordance with the downsizing of camera, it has been recently required that the distance between the shutter base plate 1 and the auxiliary base plate 3 is made to become small as much as possible. Accordingly, the four blades 35 to 38 for the front blade lie tightly between the shutter base plate 1 and the middle base plate 2 when the four blades for the front blades 35 to 38 overlap with one another, and the four blades 41 to 44 for the rear blade lie tightly between the middle base plate 2 and the auxiliary base plate 3 when the four blades 41 to 44 overlap with one another. As a result, both of the four blades 35 to 38 for the front blade and the four blades 41 to 44 for the rear blade must begin to move against friction which is larger than that in the prior art, when the four blades 35 to 38 and the four blades 41 to 44 are spread from the states in which the four blades 35 to 38 overlap with one another and the four blades 41 to 44 overlap with one another, respectively.

In such a situation, the four blades 35 to 38 for the front blade are spread from the state in which the four blades 35 to 38 for the front blades overlap with one another, when the set operation is performed, in the present embodiment. Accordingly, there is no especially large problem in the case of the front blade even though the timing of the start of the operation of the front blade is unstable more or less. However, the four blades 41 to 44 for the rear blade are spread from the state in which the four blades 41 to 44 for the rear blades overlap with one another, when the exposure operation is performed. As a result, even though that the timing of the start of the operation of the rear blade becomes a little unstable, the unstable timing is large problem in the case of the rear blade.

Accordingly, in the case of the present embodiment, the outline-forming edge of the middle plate 2 is shaped like the above-described arc in order to efficiently make a small contact area between the blade 41 of the overlapped rear blade and the middle plate 2 relative to the constitution of the whole of the focal plane shutter. That is to say, the positions of the upper both ends of the middle plate 2 are determined as in the prior art for the sake of the convenience of the fitting of the middle plate 2 to the shutter base plate 1 or in order for the fitting area of the middle plate 2 not to intercept the movements of the blades, and, in addition, the reason why the upper-side edge of the middle plate 2 is shaped like an arc is that it is considered so that the blade 41 moves smoothly and it is as hard as possible for the front blade 41 to lean when the blade 41 begins to move. Besides, if an shape for the outline-forming edge of the middle plate 2 makes it possible to make a small contact area between the blade 41 in the overlapped rear blade and the middle plate 2, an effect is obtained by the shape for the outline-forming edge accordingly even though the outline-forming edge is not shaped like the arc as in the present embodiment.

Now, the explanation of the present embodiment is returned to the matter of the exposure operations of the front and rear blades. The front and rear blades of the present embodiment expose light to the imaging plane of an image sensor by forming a slit with a set distance in the above-described manner, and it is required that any areas of the imaging plane to be exposed are equal to one another in the amount of exposure by the front and rear blades, as known in public. However, even though a shutter unit is made in accordance with a set standard at first in manufacturing shutter units, the distribution of amounts of exposure in the imaging plane does not become regular when the shutter unit is integrated into a camera or after the camera is sold, so that exposure unevenness may be occur in the camera. Accordingly, a digital camera which is provided with a focal plane shutter of the present embodiment is formed in such a way that the digital camera can automatically correct the exposure unevenness even though the exposure unevenness occurs in the camera.

Accordingly, in order to make it possible to perform such a correction, the focal plane shutter of the present embodiment is formed in such a way that: two photoelectric sensors 45 and 46 are fitted on the shutter base plate 1; light intercepting parts 33a and 33b are formed in the arm 33 of the front blade; light intercepting parts 39a and 39b are formed in the arm 39 of the rear blade; and the width of the slit which is formed by the front and rear blades is detected when the slit is located in each of three areas of the upper area, the middle area, and the lower area of the opening 1a, as described above.

And, the detections of the width of slit in the three areas are performed in such a way that: the length of time between the removal of the light intercepting part 33a of the arm 33 from the optical path of the photoelectric sensor 45 and the removal of the light intercepting part 39a of the arm 39 from the optical path of the photoelectric sensor 46 is detected in the upper area of the opening 1a; the length of time between the interception of the optical path of the photoelectric sensor 45 by the light intercepting part 33b of the arm 33 and the interception of the optical path of the photoelectric sensor 46 by the light intercepting part 39b of the arm 39 is detected in the middle area of the opening 1a; and the length of time between the removal of the light intercepting part 33b of the arm 33 from the optical path of the photoelectric sensor 45 and the removal of the light intercepting part 39b of the arm 39 from the optical path of the photoelectric sensor 46 is detected in the lower area of the opening 1a.

Besides, the correction with such detection results of the slit widths may be performed in such a way that the time to cut off the supply of electric current to the coil 20b of the electromagnet 20 for the rear blade by a control circuit on the camera side is electrically tweaked in order to perform next shooting with proper exposure. However, the correction may be also performed in such a way that: the information of a captured image is sent from a memory to an image processing circuit on the camera-body side to be corrected, in detection; and then the corrected image information is stored in the memory.

As described above, the four blades 35 to 38 for the front blades and the four blades 41 to 44 for the rear blade form a slit between the slit-forming blades 38 and 44 to move downward. The driving pin 10c of the front blade driving member 10 meets the buffer member 4 immediately after the four blades 35 to 38 draw apart form the opening 1a to the lower area of the opening 1a while overlapping with one another, so that the exposure operation of the front blade is stopped, and the driving pin 11b of the rear blade driving member 11 meets the buffer member 5 immediately after the four blades 41 to 44 are spread to fully close the opening 1a, so that the exposure operation of the rear blade is stopped. These states are shown in FIGS. 1 and 2. And, as already explained, the set operation of the focal plane shutter is performed immediately after image information is stored in a memory in these states, and the movable mirror which is provided on the camera-body side returns into the optical path for shooting in parallel with the operation.

Figure 11:
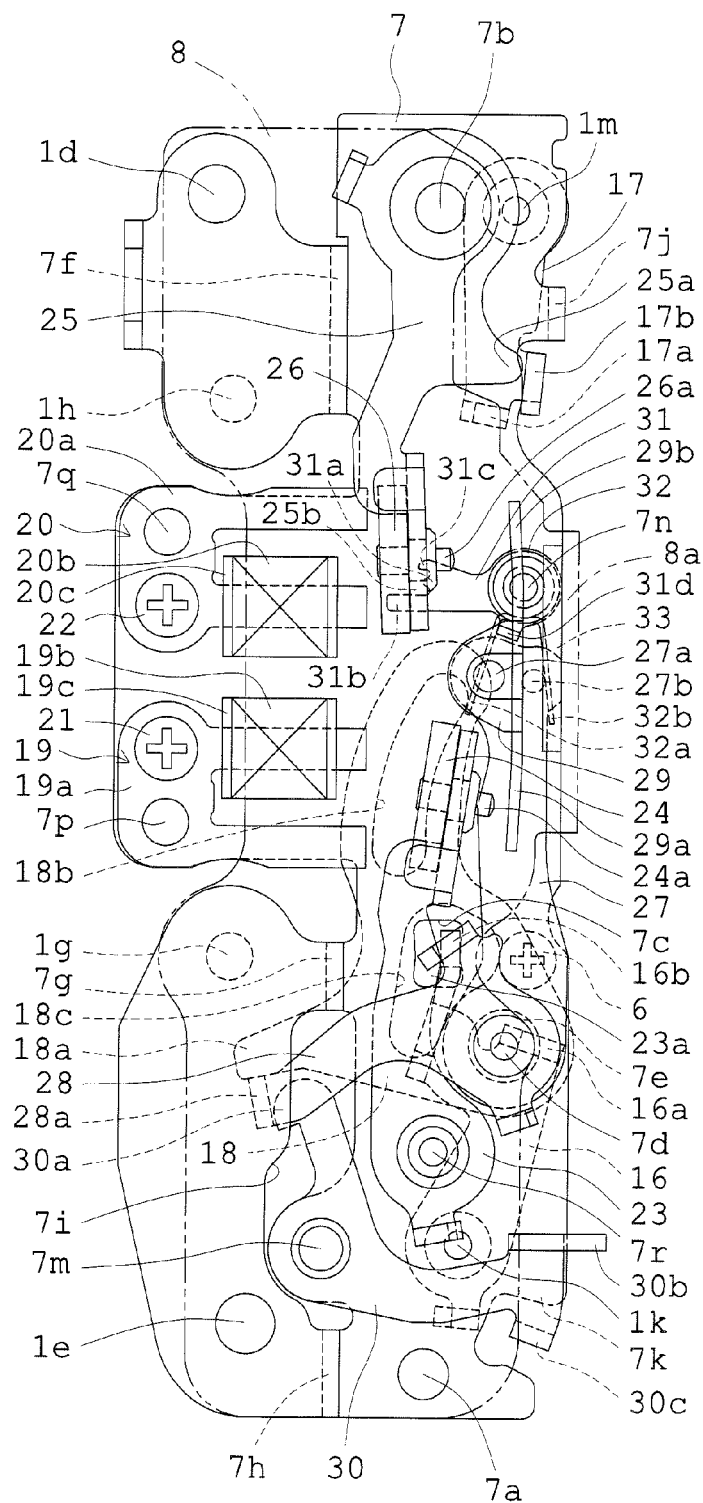
FIG. 11 is a plane view showing the state of the lock-releasing mechanism which is on standby for shooting, in the case where shooting is performed in a shooting mode with monitor.
Figure 12:
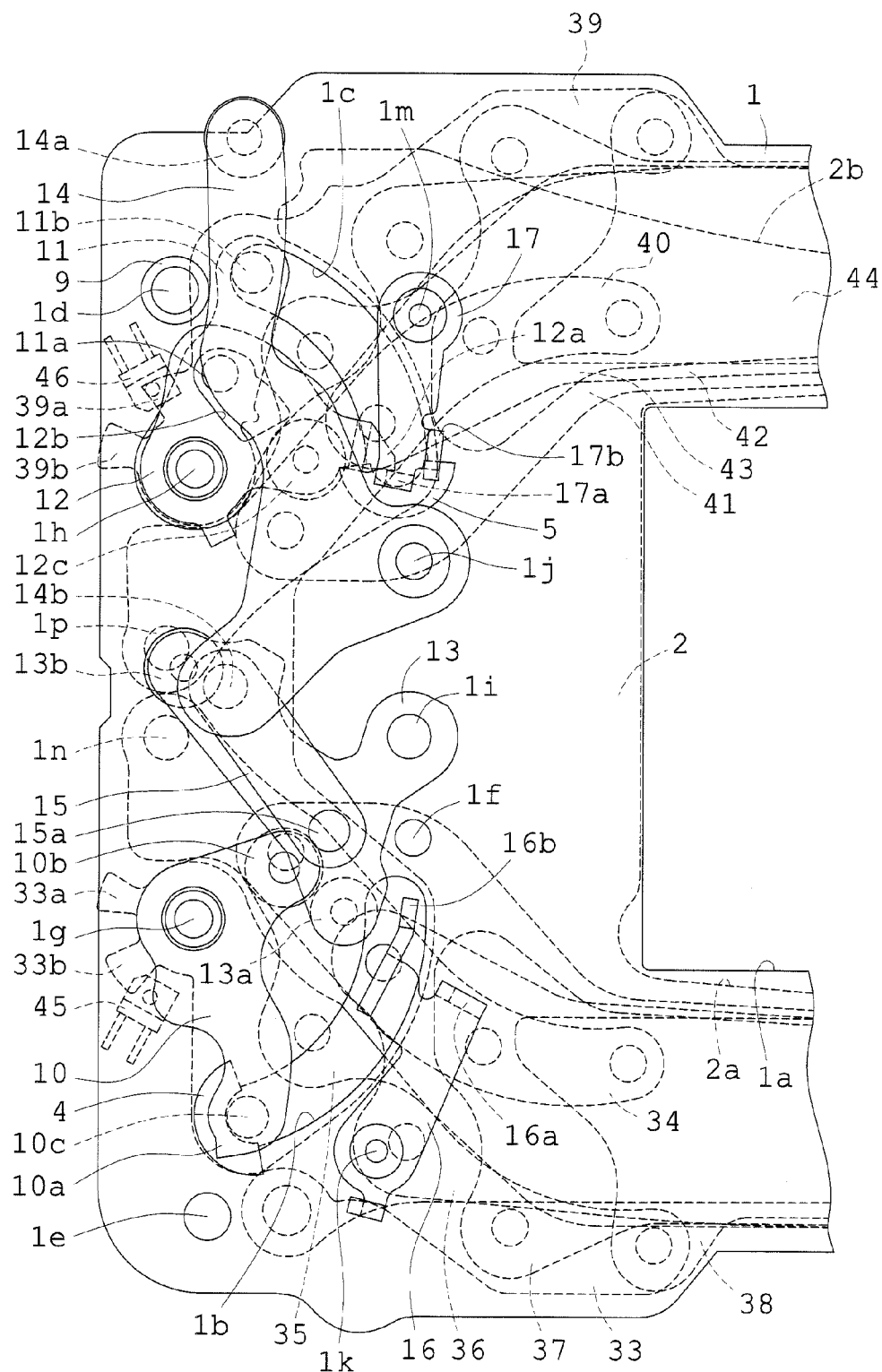
FIG. 12 is a plane view showing the state of the open and close operating mechanism which is on standby for shooting, in the case where shooting is performed in a shooting mode with monitor.

Next, the operation in a shooting mode with monitor will be explained, and a part of the drawings which are used for the above-described explanation are quoted in explanation of the operation and FIGS. 11 to 13 are newly used. As already explained, the set termination state in the present embodiment is shown in FIGS. 6 and 7. Also, in this case, the movable mirror on the camera-body side is located on the optical path for shooting to reflect light from an object to a finder optical system. As a result, an object image can be observed through the optical finder in this state. In the case where shooting is performed in a shooting mode with monitor in such a state, a photographer presses the selection switch provided with the camera to turn the selection switch on. As a result, not only the release button for capturing a still image but also the release button for capturing a moving image which is locked up to now can be pressed by a signal resulting from the press of the selection switch, and, in addition, the movable mirror is made to draw apart from the optical path for shooting.

On the other hand, when the selection switch is turned on, the release member 30 which is in the state shown in FIG. 7 is rotated clockwise by the member on the camera-body side. As a result, as already explained, the hold member 27 and the auxiliary hold member 28 are rotated clockwise. At this point in time, the coils 19b and 20b of the two electromagnets 19 and 20 for the front and rear blades are not electrified. As a result, when the hold member 27 begins to rotate clockwise, the lock-releasing members 23 and 25 for the front and rear blades in which the iron piece members 24 and 26 are pressed by the pressing member 29 to be made to come into contact with the iron-core members 19a and 20a respectively begin to rotate by the biasing forces of the springs which are not shown in the drawings, respectively.

In this case, the lock-releasing member 23 for the front blade follows the pressing member 29 to continue to rotate clockwise, so that the pressed part 16b of the front blade locking member 16 can be pressed by the pressing part 23a. However, in the lock-releasing member 25 for the rear blade, the restrained part 25b of the lock-releasing member 25 for the rear blade meets the restraining part 31a of the restraining member 31 to be restrained, before the restraining part 31a escapes from the trajectory of the movement of the restrained part 25b by the rotation of the hold member 27, so that the pressed part 17b of the rear blade locking member 17 cannot be pressed by the pressing part 25a. Besides, in the present embodiment, the surface of the restraining part 31a with which the restraining parts 31a of the restraining member 31 comes into contact with the restrained part 25b is formed as an arc surface. Accordingly, the restraining member 31 may be rotated either clockwise or counterclockwise by the contact between the restraining part 31a and the restrained part 25b. However, in such a case, the rotation-stopping parts 31b and 31c prevent this rotation.

The hold member 27 continues to rotate to the end while the engagement pin 27b is pressing the arm 32b of the connection spring 32 to tense the connection spring 32 even after the lock-releasing member 25 for the rear blade is restrained in such a manner. And, the pressing part 23a of the lock-releasing member 23 for the front blade presses the pressed part 16b to rotate the front blade locking member 16 clockwise and releases the front blade driving member 10 from the front blade locking member 16 into which is the front blade driving member 10 is locked, so that the front blade driving member 10 is speedily rotated clockwise by the biasing force of the front blade driving spring which is not shown in the drawings, and the driving pin 10c meets the buffer member 4 after the four blades 35 to 38 for the front blade fully open the opening 1a to stop the front blade driving member 10, as already explained. This state is shown in FIGS. 11 and 12, is a shooting-standby state in a shooting mode with electronic finder, and is a state in which an object image can be observed with monitor.

Now, the case of shooting for capturing a still image in such a state will be explained next. In this case, the release button for capturing a still image is pressed as in the case of the above-described shooting mode with optical finder. As a result, the coils 19b and 20b of the two electromagnets 19 and 20 are electrified. However, because the selection switch is already turned on, the operation which is performed by a signal from the selection switch afterward is different from that in the above-described shooting mode with optical finder.

When the coils 19b and 20b of the two electromagnets 19 and 20 are electrified in the above-described manner, a member on the camera-body side presses the roller 14a shown in FIG. 12 to rotate the release operation member 14 clockwise. As a result, the setting member 13 is rotated clockwise, like the set operation which is already explained, so that the auxiliary setting member 18 which is shown in FIG. 11 is rotated counterclockwise. However, the second rear blade-driving member 12 is already locked into the rear blade locking member 17 in the state which is shown in FIG. 12, so that the setting member 13 rotates only the front blade driving member 10 counterclockwise through the roller 13a against the biasing force of the front blade driving spring which is not shown in the drawings. And, when the four blades 35 to 38 for the front blade close the opening 1a, the setting member 13 presses the roller 12c of the second rear blade-driving member 12 through the roller 13b, and the setting member 13 rotates the front blade driving member 10 and the second rear blade-driving member 12 up to the state which is shown in FIG. 5, afterward.

On the other hand, the auxiliary setting member 18 rotates the hold member 27 and the auxiliary hold member 28 counterclockwise by the counterclockwise rotation of the auxiliary setting member 18. As a result, the pressing member 29 rotates the lock-releasing members 23 and 25 for the front and rear blades which are in the states shown in FIG. 11, against the biasing forces of the springs for the front and rear blades, while the position of the pressing member 29 is being changed relative to the hold member 27, so that the iron piece members 24 and 26 which are fitted to the lock-releasing members 23 and 25 respectively are made to come into contact with the iron-core members 19a and 20a, respectively. And, when such a state of the focal plane shutter is obtained, the front blade driving member 10 and the second rear blade driving member 12 are also in the state in which is shown in FIG. 5. Accordingly, the member on the camera-body side separates from the roller 14a of the setting operation member 14, and the setting member 13 returns to its initial position. As a result, the open and close operating mechanism reaches the state which is shown in FIG. 6, and the lock-releasing mechanism reaches the state which is shown in FIG. 7.

When the open and close operating mechanism and the lock releasing mechanism reach the states which are shown in FIGS. 6 and 7 in such a manner, respectively, the exposure operation by the front and rear blades are immediately performed as in the already-explained case of the shooting mode with optical finder, and when the open and close operating mechanism and the lock releasing mechanism reach the states which are shown in FIGS. 2 and 3, respectively, shooting is finished. And, when image information is stored in the memory, the set operation is immediately performed and the movable mirror returns into the optical path for shooting, as in the case of the shooting mode with optical finder. Accordingly, the set termination state after shooting in the shooting mode with monitor becomes quite the same as that after shooting in the shooting mode with optical finder, which is shown in FIGS. 6 and 7. Accordingly, in order to continuously perform another shooting in the shooting mode with monitor, the shooting should be performed after the selection switch is pressed again to be turned on.

Next, the case of shooting for capturing a moving image after turning the selection switch on will be explained. In the explanation of the operation of the focal plane shutter of the present embodiment, it is possible to perform shooting for capturing a moving image only in the shooting mode with monitor. Accordingly, as described above, when the selection switch which is provided for the camera is pressed to be turned on, the release button for capturing a moving image which is locked up to now can be pressed by a signal resulting from the press of the selection switch, and, in addition, the movable mirror is made to draw apart from the optical path for shooting. And then, the open and close operating mechanism and the lock releasing mechanism of the present embodiment reach the shooting-standby states which are shown in FIGS. 11 and 12, respectively, in the above-described manner. At this point in time, if the release button for capturing a still image is pressed, shooting for capturing a still image is performed in the above-described manner, while the release button for capturing a moving image is pressed in the case where shooting for capturing a moving image is performed.

Accordingly, when the release button for capturing a moving image is pressed, the coils 19b and 20b of the two electromagnets 19 and 20 for the front and rear blades are not electrified at all in this case, as in the cases of shootings for capturing a still image in the two above-described shooting modes, shooting for capturing a moving image is immediately performed, and the shooting is continued during the press of the release button. Afterward, when the release button is released, the shooting is finished. And, when the shooting is finished, the set operation immediately starts by a signal resulting from the termination of the shooting. The set operation in this case is similar to the set operation before actually performing the exposure operation in shooting for capturing a still image in the above-described shooting mode with electronic finder, and the set operation in this case is different from to the set operation before actually performing the exposure operation in shooting for capturing a still image in the above-described shooting mode with electronic finder only in that the coil 19b and 20b are not electrified.

That is to say, when the release button is released, a signal resulting from the release of the release button makes the member on the camera-body side rotate the release operation member 14 clockwise in FIG. 12, and the setting member 13 is rotated clockwise through the link member 15. As a result, the auxiliary setting member 18 is rotated counterclockwise in FIG. 11. Accordingly, on the one hand, in FIG. 12, the setting member 13 rotates only the front blade driving member 10 counterclockwise through the roller 13a against the biasing force of the front blade driving spring which is not shown in the drawings. And, when the four blades 35 to 38 for the front blade close the opening 1a, the setting member 13 rotates the second rear blade-driving member 12 counterclockwise through the roller 13b, and the setting member 13 rotates the front blade driving unit 10 and the second rear blade-driving unit 12 up to the state which is shown in FIG. 5, afterward.

On the other hand, in FIG. 11, when the auxiliary setting member 18 rotates counterclockwise, the hold member 27 and the auxiliary hold member 28 also rotate counterclockwise. As a result, the pressing member 29 rotates the lock-releasing members 23 and 25 for the front and rear blades, while the position of the pressing member 29 is being changed relative to the hold member 27, so that the iron piece members 24 and 26 which are fitted to the lock-releasing members 23 and 25 respectively are made to come into contact with the iron-core members 19a and 20a, respectively. And, when such a state of the focal plane shutter is obtained, the front blade driving member 10 and the second rear blade driving member 12 are also in the state in which is shown in FIG. 5. Accordingly, the member on the camera-body side separates from the roller 14a of the setting operation member 14, and the setting member 13 returns to its initial position. As a result, the open and close operating mechanism reaches the state which is shown in FIG. 6, and the lock-releasing mechanism reaches the state which is shown in FIG. 7. And, the movable mirror is made to return into the optical path for shooting in parallel such a operation.

The set termination state in such a manner is quite the same as that in the shooting mode with optical finder. Accordingly, the release button for capturing a moving image is locked in this state. Accordingly, when the attempt to perform shooting for capturing a moving image again is made, the shooting should be performed with monitor after the selection switch is pressed again to be turned on and the lock of the release button for capturing a moving image is released.

Besides, in the explanation of the operation of the focal plane shutter of the present embodiment, it is supposed that the camera body is provided with the selection switch, the release button for capturing a still image, and the release button for capturing a moving image. In addition, the explanation of the present embodiment relates to the case where the focal plane shutter of the present embodiment reaches the shooting-standby state for shooting in the shooting mode with optical finder after shooting in the shooting mode with monitor. However, a focal plane shutter for digital camera of the present invention is not limited to a focal plane shutter in which only such operation is performed. For example, a focal plan shutter of the present invention may be formed in such a way that only shooting for capturing a still image can be performed but shooting for capturing a moving image cannot be performed.

Also, in the explanation of the operation of the focal plane shutter of the present embodiment, the selection switch must be pressed as often as an attempt to perform shooting in the shooting mode with monitor is made. However, when a focal plane shutter of the present invention is provided with a switching selection means (switch) by which either the shooting mode with optical finder and the shooting with monitor can be selected, it is also possible to perform shooting with monitor continuously many times only by pressing the release button for capturing a still image when the shooting mode with monitor is selected by the switching selection means.

Accordingly, one example of such a constitution will be explained. First, the operation which is performed when the shooting mode with optical finder is changed into the shooting mode with monitor by the switching selection means is made to become the same operation as performed in pressing the selection switch in the explanation of the operation of the present embodiment. And, when the release button for capturing a still image is pressed in this state, shooting for capturing a still image starts, and when the release button for capturing a moving image is pressed in this state, shooting for capturing a moving image starts.

Accordingly, first, when the release button for capturing a still image is pressed, the exposure operation is performed as in the above-described operation in the present embodiment, and then, when the focal plane shutter reaches the state which is shown in FIGS. 6 and 7 (the set state in the explanation of the operation in the present embodiment) afterward, the release member 30 is rotated clockwise subsequently, so that the focal plane shutter is made to reach the shooting-standby state which is shown in FIGS. 11 and 12. As a result, next shooting in the shooting mode with monitor can be performed only by pressing the release button for capturing a still image. Also, also when the release button for capturing a moving image is pressed, shooting for capturing a moving image is performed with the same operation as that of the present embodiment, and then when the focal plane shutter reaches the state which is shown in FIGS. 6 and 7 afterward, the release member 30 is rotated clockwise subsequently, so that the focal plane shutter is made to reach the shooting-standby state in the shooting mode with electronic finder, which is shown in FIGS. 11 and 12.

And, when shooting mode with monitor is changed into shooting mode with optical finder by the switching selection means, the focal plane shutter should be formed in such a way that the state of the focal plane shutter is changed from the state which is shown in FIGS. 11 and 12 to the state which is shown in FIGS. 6 and 7 with the same operation as that of the present embodiment after shooting for capturing a moving image.

What is claimed is:

1. A focal plane shutter for digital cameras in which a front blade and a rear blade are arranged in two blade rooms, respectively, the two blade rooms being formed by a middle plate partitioning a space between a shutter base plate and an auxiliary base plate, the focal plane shutter for digital cameras comprising:

a front locking blade locking member into which a front blade driving member is locked until the front blade driving member is rotated by a biasing force of a front blade driving spring so as to start exposure operation of the front blade, a rear blade locking member into which a rear blade driving member is locked until the rear blade driving member is rotated by a biasing force of a rear blade driving spring so as to start exposure operation of the rear blade, a front blade lock releasing member which is made to come into contact with an iron-core member of a first electromagnet in a set state, is attracted and held by the iron-core member of the first electromagnet when a coil of the first electromagnet is electrified by a supply of electric current, and then, as the supply of electric current to the coil of the first electromagnet is cut off, is separated from the iron-core member of the first electromagnet by a biasing force of a front blade releasing spring to release the front blade driving member from the front blade locking member, a rear blade lock releasing member which is made to come into contact with an iron-core member of a second electromagnet in the set state, is attracted and held by the iron-core member of the second electromagnet when a coil of the second electromagnet is electrified by a supply of electric current, and then, as the supply of electric current to the coil of the second electromagnet is cut off, is separated from the iron-core member of the second electromagnet by a biasing force of a rear blade releasing spring to release the rear blade driving member from the rear blade locking member, a hold member which, in the set state, presses the front blade lock releasing member and the rear blade lock releasing member onto the iron-core member of the first electromagnet and the iron-core member of the second electromagnet, respectively, against the biasing force of the front blade releasing spring and the biasing force of the rear blade releasing spring, respectively, and, when the coil of the first electromagnet and the coil of the second electromagnet are electrified in shooting, relieves the front blade lock releasing member and the rear blade lock releasing member from a pressing force and is withdrawn from trajectories of the front blade lock releasing member and the rear blade lock releasing member, and a restraining member configured to rotate in a reciprocating manner in response to reciprocation of the hold member, wherein, in the set state, the restraining member has been moved into the trajectory of the rear blade lock releasing member, and then, when the hold member is withdrawn from the trajectories of the front blade lock releasing member and the rear blade lock releasing member and the coil of the second electromagnet is not electrified, the restrain member restrains the rear blade lock releasing member from moving away from the iron-core member of the second electromagnet before the rear blade lock releasing member releases the rear blade driving member from the rear blade locking member.

2. The focal plane shutter for digital cameras according to claim 1, wherein the hold member is provided with an engagement part, the restraining member is provided with an engagement part, a spring is wound around a rotation shaft of the restraining member and has a first arm portion and a second arm portion, the engagement part of the restraining member is arranged between the first arm portion and the second arm portion of the spring, the spring has biasing force with which to hold the engagement part of the hold member between a distal end of the first arm portion of the spring and a distal end of the second arm portion of the spring, the engagement part of the hold member presses the first arm portion of the spring in moving the hold member to the set position, so that the second arm portion of the spring is made to press the engagement part of the restraining member and the restraining member is moved into the trajectory of the rear blade lock releasing member, and the engagement part of the hold member presses the second arm portion of the spring in moving the hold member from the set position, so that the first arm portion of the spring is made to press the engagement part of the restraining member and the restraining member is withdrawn from the trajectory of the rear blade lock releasing member.

3. The focal plane shutter for digital cameras according to claim 1, wherein the rear blade driving member is composed of a first rear blade driving member and a second rear blade driving member which are configured to be coaxially rotatable, the first rear blade driving member is connected to the rear blade and, in a set operation, is made to follow the second rear blade driving member by a biasing force of a setting spring to rotate, and the second rear blade driving member is locked into the rear blade locking member before the exposure operation of the rear blade is started, and the second rear blade driving member is made to rotate by the biasing force of the rear blade driving spring to press the first rear blade driving member against the biasing force of the setting spring when the second rear blade driving member is released from the rear blade locking member.

4. The focal plane shutter for digital cameras according to claim 1, wherein the rear blade includes two arms which are pivotally mounted on the shutter base plate and a plurality of oblong card-shaped blades which are pivotally supported by the arms along a longitudinal direction of the arms in turn, the oblong card-shaped blades are withdrawn from an exposure aperture as overlapping with one another in the set state, and a contour edge of an area of the middle plate that overlaps with the plurality of oblong card-shaped blades in the set state is shaped into an arc that is convex toward an exposure-aperture side, and a width with which the middle plate overlaps with the plurality of the oblong card-shaped blades is smaller in a middle portion than end portions in a longitudinal direction of the individual oblong card-shaped blades.

5. The focal plane shutter for digital cameras according to claim 1, wherein the hold member is rotatable from its normal position within a predetermined range of rotation angles and includes a pressing member having a first pressing part and a second pressing part, in the set operation, the first pressing part pressing the front blade lock releasing member against the biasing force of the front blade releasing spring and the second pressing part pressing the rear blade lock releasing member against the biasing force of the rear blade releasing spring, to make the front blade lock releasing member and the rear blade lock releasing member come into contact with the iron-core member of the first electromagnet and the iron-core member of the second electromagnet, respectively, the hold member is locked into a release member in the set state, the hold member is actuated by the biasing force of a spring when the hold member is released from the release member into which the hold member is locked, so that the front blade lock releasing member and the rear blade lock releasing member are actuated by the biasing forces of the front blade releasing spring and the rear blade releasing spring, and at least one of the first pressing part and the second pressing part of the pressing member can meet a buffer member which is fitted to a member that is integrated with the shutter base plate, when actuation of the hold member by the biasing force of the spring is stopped.

* * * * *